US012462858B2

(12) United States Patent
Carissimi et al.

(10) Patent No.: US 12,462,858 B2
(45) Date of Patent: Nov. 4, 2025

(54) IN-MEMORY COMPUTATION DEVICE HAVING IMPROVED DRIFT COMPENSATION

(71) Applicant: STMicroelectronics S.r.l., Agrate Brianza (IT)

(72) Inventors: Marcella Carissimi, Treviolo (IT); Marco Pasotti, Travaco' Siccomario (IT); Riccardo Zurla, Binasco (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 96 days.

(21) Appl. No.: 18/542,938

(22) Filed: Dec. 18, 2023

(65) Prior Publication Data

US 2024/0212730 A1    Jun. 27, 2024

(30) Foreign Application Priority Data

Dec. 23, 2022  (IT) .................... 102022000026760

(51) Int. Cl.
*G11C 11/418*     (2006.01)
*G11C 7/12*       (2006.01)
(Continued)

(52) U.S. Cl.
CPC ............. *G11C 7/222* (2013.01); *G11C 7/12* (2013.01); *G11C 8/08* (2013.01)

(58) Field of Classification Search
CPC .. G11C 7/222; G11C 7/12; G11C 8/08; G11C 5/147; G11C 7/1006;
(Continued)

(56) References Cited

U.S. PATENT DOCUMENTS 8,699,273 B2    4/2014  Bingoga
8,902,678 B2   12/2014  Dimartino et al.
(Continued)

FOREIGN PATENT DOCUMENTS

WO    2021137894 A1    7/2021
WO    2021158861 A1    8/2021

OTHER PUBLICATIONS

IT Search Report and Written Opinion for priority application, IT Appl. 102022000026760, report dated Jun. 20, 2023, 9 pgs.
(Continued)

*Primary Examiner* — Hien N Nguyen
(74) *Attorney, Agent, or Firm* — Crowe & Dunlevy LLC

(57) ABSTRACT

An in-memory computation device includes a word line activation circuit that receives an input signal indicative of input values and provides activation signals each as a function of the input value. The in-memory computation device further includes a memory array, a biasing circuit generating a bias voltage and a digital detector. The memory array has memory cells coupled to a bit line and each to a word line. Each memory cell stores a computational weight. In response to an activation signal, a cell current flows through each memory cell as a function of the bias voltage, the activation signal and the computational weight. A bit line current flows through the bit line as a function of a summation of the cell currents. The digital detector is coupled to the bit line, samples the bit line current and, in response, provides an output signal.

21 Claims, 10 Drawing Sheets

(51) Int. Cl.
*G11C 7/22* (2006.01)
*G11C 8/08* (2006.01)
*G11C 11/419* (2006.01)

(58) Field of Classification Search
CPC ........ G11C 13/0028; G11C 2013/0045; G11C 11/54; G11C 13/0026; G11C 13/004; G11C 13/0061; G11C 13/0004; G11C 11/418; G11C 11/419; G11C 13/003; G06N 3/065
See application file for complete search history.

(56) References Cited

U.S. PATENT DOCUMENTS

| | | | |
|---|---|---|---|
| 8,953,360 | B2 | 2/2015 | Bedeschi |
| 9,396,795 | B1 | 7/2016 | Jeloka et al. |
| 9,508,446 | B1 | 11/2016 | Chen et al. |
| 9,859,008 | B1 | 1/2018 | Kim |
| 9,887,011 | B1 | 2/2018 | Hung |
| 10,056,145 | B2 | 8/2018 | Backhausen et al. |
| 10,073,733 | B1 | 9/2018 | Jain et al. |
| 10,319,449 | B1 | 6/2019 | Yang |
| 10,373,682 | B2 | 8/2019 | Parkinson et al. |
| 10,636,481 | B1 | 4/2020 | Chang et al. |
| 10,643,677 | B2 | 5/2020 | Yabe |
| 10,692,570 | B2 | 6/2020 | Al-Shamma |
| 10,762,958 | B2 | 9/2020 | Pyo et al. |
| 10,831,446 | B2 | 11/2020 | Chen et al. |
| 10,943,652 | B2 | 3/2021 | Lu et al. |
| 11,024,393 | B1 | 6/2021 | Zhang et al. |
| 11,043,259 | B2 | 6/2021 | Wentzlaff et al. |
| 11,061,646 | B2 | 7/2021 | Sumbul et al. |
| 11,100,987 | B1 | 8/2021 | Mantegazza et al. |
| 2017/0263306 | A1* | 9/2017 | Murphy .............. G11C 11/4091 |
| 2018/0260696 | A1 | 9/2018 | Suda et al. |
| 2019/0279709 | A1 | 9/2019 | Lee |
| 2020/0233923 | A1 | 7/2020 | Knag et al. |
| 2021/0033648 | A1 | 2/2021 | Khaddam-Aljameh et al. |
| 2021/0035636 | A1 | 2/2021 | Nazarian |
| 2021/0134343 | A1 | 5/2021 | Li et al. |
| 2021/0271597 | A1 | 9/2021 | Verma et al. |
| 2021/0279036 | A1 | 9/2021 | Li et al. |
| 2021/0334639 | A1 | 10/2021 | Tran |
| 2021/0342671 | A1 | 11/2021 | Hoang et al. |
| 2021/0343320 | A1 | 11/2021 | Horng et al. |
| 2021/0349689 | A1* | 11/2021 | Lu ........................... G11C 5/02 |
| 2022/0004852 | A1 | 1/2022 | Ju et al. |
| 2022/0012586 | A1* | 1/2022 | Lin .......................... G06N 5/04 |
| 2022/0028445 | A1* | 1/2022 | Park ................... H03K 19/1737 |
| 2022/0044099 | A1 | 2/2022 | Conte et al. |
| 2022/0068380 | A1 | 3/2022 | Carissimi et al. |
| 2024/0055033 | A1* | 2/2024 | Hsu .......................... G11C 7/12 |
| 2024/0212730 | A1 | 6/2024 | Carissimi et al. |
| 2024/0212751 | A1* | 6/2024 | Zurla .................. G11C 13/003 |
| 2024/0404594 | A1* | 12/2024 | Carissimi ........... G11C 13/0061 |

OTHER PUBLICATIONS

Mayahinia Mahta et al: "A Voltage-Controlled, Oscillation-Based ADC Design for Computation-in-Memory Architectures Using Emerging ReRAMs," ACM Journal on Emerging Technologies in Computing Systems, vol. 18, No. 2, Article 32, Pub date Mar. 2022, 26 pgs.

Zhang Xueyong et al: "A 0.11-0.38 pJ/cycle Differential Ring Oscillator in 65 nm CMOS for Robust Neurocomputing," IEEE Transactions on Circuits and Systems—I: Regular Papers, vol. 68, No. 2, Feb. 2021, 15 pgs.

Biswas, et al: "CONV-SRAM: An Energy-Efficient SRAM With In-Memory Dot-Product Computation for Low-Power Convolutional Neural Networks," IEEE Journal of Solid-State Circuits 54, No. 1, Dec. 17, 2018, pp. 217-230.

Chi, et al: "Prime: A Novel Processing-In-Memory Architecture for Neural Network Computation in ReRAM-Based Main Memory," ACM SIGARCH Computer Architecture News 44, No. 3, Jun. 18, 2016, pp. 27-39.

Lelmini, Daniele et al: "Device and Circuit Architectures for In-Memory Computing," Advanced Intelligent Systems, Sep. 2020, 19 pages.

Mittal, Sparsh: "A Survey of ReRAM-Based Architectures for Processing-In-Memory and Neural Networks," Machine Learning and Knowledge Extractions 1, No. 1, Mar. 2019, pp. 75-114.

Xie, Chenchen, et al: "Speeding Up the Write Operation for Multi-Level Cell Phase Change Memory with Programmable Ramp-Down Current Pules," Micromachines 2019, www.mdpi.com/journal/micromachines, 13 pages.

Khaddam-Aljameh R et al: "Hermes Core—A 14NM CMOS and PCM-Based in Memory Compute Core Using an Array of 300PS/LSB Linearized CCO-Based ADCS and Local Digital Processing", 2021 Symposium on VLSI Circuits Digest of Technocal Papers, 3 pgs.

* cited by examiner

IN-MEMORY COMPUTATION DEVICE HAVING IMPROVED DRIFT COMPENSATION

PRIORITY CLAIM

This application claims the priority benefit of Italian Application for Patent No. 102022000026760 filed on Dec. 23, 2022, the content of which is hereby incorporated by reference in its entirety to the maximum extent allowable by law.

TECHNICAL FIELD

The present invention relates to an in-memory computation device having improved drift compensation.

BACKGROUND

As is known, an in-memory computation device uses the specific arrangement of the memory cells of a memory array to perform an analogic data processing at the cell level.

For example, in-memory computation devices are used to perform multiply and accumulate (MAC) operations, which are for example employed to implement machine learning algorithms, such as neural networks.

A multiply and accumulate operation provides an output vector $y_1, \ldots, y_M$ as the multiplication of an input vector $x_1, \ldots, x_N$ by a vector or matrix of computational weights $g_{ij}$, e.g.:

$$\begin{bmatrix} y_1 \\ y_2 \\ \vdots \\ y_m \end{bmatrix} = \begin{bmatrix} g_{11} & g_{12} & \cdots & g_{1n} \\ g_{21} & g_{22} & \cdots & g_{2n} \\ \vdots & \vdots & \vdots & \vdots \\ g_{m1} & g_{m2} & \cdots & g_{mn} \end{bmatrix} \times \begin{bmatrix} x_1 \\ x_2 \\ \vdots \\ x_n \end{bmatrix},$$

i.e.:
$$\begin{cases} y_1 = g_{11} \cdot x_1 + g_{12} \cdot x_2 + \ldots + g_{1N} \cdot x_N \\ y_2 = g_{21} \cdot x_1 + g_{22} \cdot x_2 + \ldots + g_{2N} \cdot x_N \\ \vdots \\ y_M = g_{M1} \cdot x_1 + g_{M2} \cdot x_2 + \ldots + g_{MN} \cdot x_N \end{cases}.$$

The in-memory computation device stores the computational weights $g_{ij}$ in the cells of the memory and performs the multiplication and summation (accumulation) operations at the cell level.

In detail, for each output vector $y_i$, the known in-memory devices generate a current indicative of a respective MAC operation, i.e. $\Sigma_{i=1}^{i=M} g_{ij} \cdot x_j$, and comprise a reading circuit having a respective analog-to-digital converter (ADC) that discretizes said current.

The in-memory computation devices allow to avoid back and forth transfer of data between a memory and an elaboration circuit. Accordingly, the performance of an in-memory computation device is not limited by the data transfer bandwidth between memory and elaboration circuit and has a low power consumption.

However, it is noted that in the known in-memory computation devices the current indicative of the MAC operation is subject to errors, for example due to time drifts of the computational values stored in the memory cells. Therefore, the known in-memory computation devices have a low computational accuracy.

There is a need to overcome the disadvantages of the prior art.

SUMMARY

According to the present invention, an in-memory computation device and a control method thereof are provided.

In an embodiment, an in-memory computation device is configured to receive an input signal indicative of a plurality of input values and to provide at least one output signal. The in-memory computation device comprises: a word line activation circuit configured to receive the input signal and to provide a plurality of activation signals, each being a function of a respective input value; a biasing circuit configured to provide a bias voltage in response to a reference current; a memory array comprising a plurality of memory cells coupled to a bit line and coupled each to a respective word line, the bit line being configured to receive the bias voltage, the memory cells being configured to store each a respective computational weight and to receive each a respective activation signal from the respective word line, the memory cells being configured to be flown through each by a respective cell current that is a function of the bias voltage, the respective activation signal and the respective computational weight, the bit line being configured to be flown through by a bit line current that is a summation of the cell currents; and a digital detector coupled to the bit line, configured to sample the bit line current and, in response, provide the at least one output signal.

In an embodiment, A method is provided for controlling an in-memory computation device configured to receive an input signal indicative of a plurality of input values and to provide at least one output signal. The in-memory computation device comprises a word line activation circuit, a biasing circuit, a memory array and a digital detector, the memory array comprising a plurality of memory cells coupled to a bit line and coupled each to a respective word line, the memory cells being configured to store each a respective computational weight and to receive each a respective activation signal from the respective word line, the memory cells being configured to be flown through each by a respective cell current that is a function of a bias voltage, the respective activation signal and the respective computational weight, the bit line being configured to be flown through by a bit line current that is a summation of the cell currents. The method comprises: providing, by the word line activation circuit, a plurality of activation signals to the memory cells, each activation signal being a function of a respective input value; generating the bias voltage from a reference current and applying the bias voltage to the bit line; and sampling, by the digital detector, the bit line current, and, in response, providing the at least one output signal.

BRIEF DESCRIPTION OF THE DRAWINGS

For a better understanding of the present invention, non-limiting embodiments are now described, with reference to the attached drawings, wherein.

DETAILED DESCRIPTION

Figure 1:
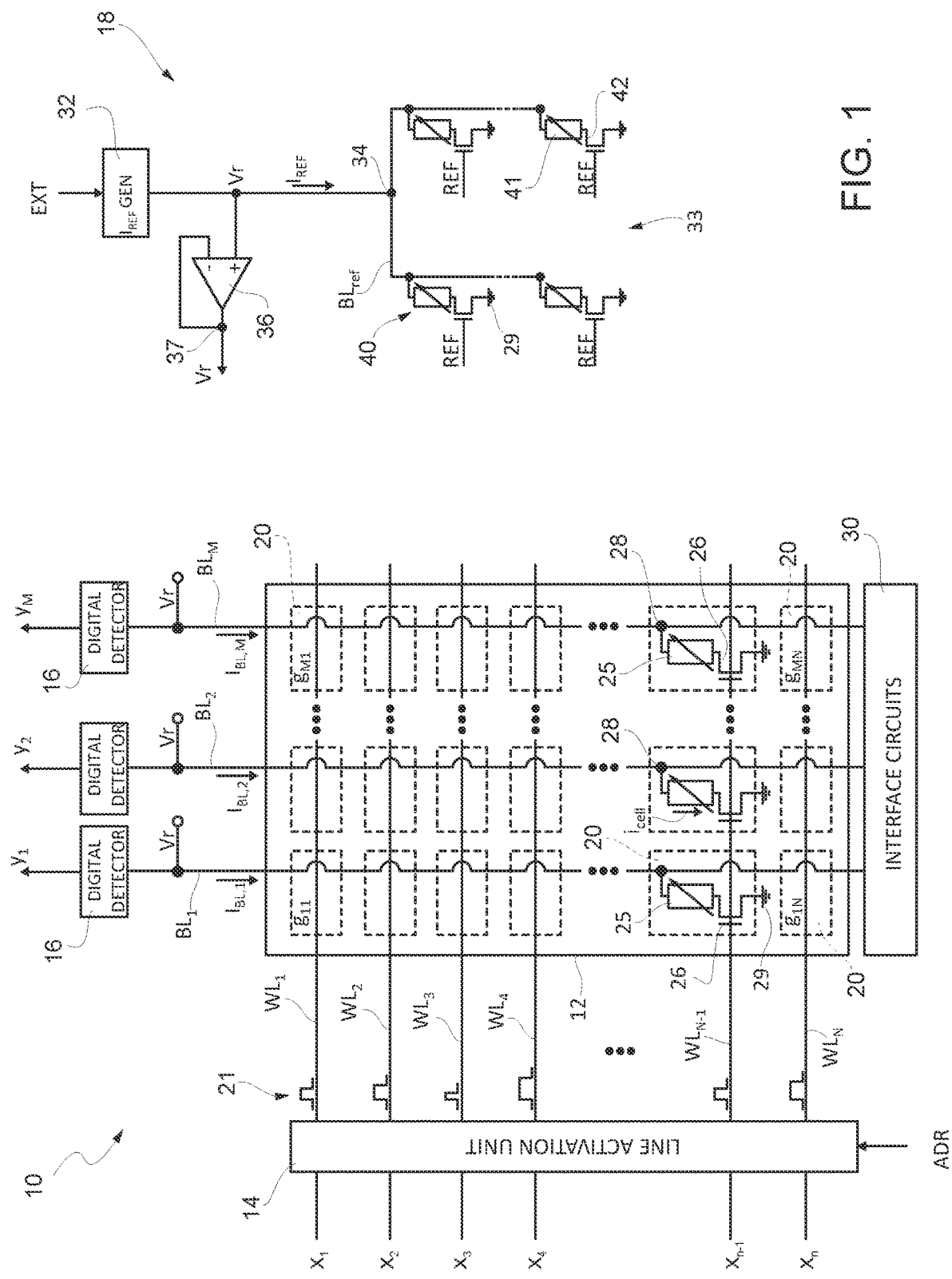
FIG. 1 shows a block diagram of the present in-memory computation device.

FIG. 1 shows an in-memory computation device 10, hereinafter also referred to as IMC device 10, comprising a computation memory array (hereinafter indicated as memory array) 12, a line activation circuit 14, a plurality of digital detectors 16 and a biasing circuit 18.

The memory array 12 is of the non-volatile type and comprises a plurality of memory cells 20 organized in a matrix arrangement having M columns and N rows.

The memory cells 20 arranged in the same column are mutually connected through a respective bit line $BL_i$, wherein i=1, ..., M. The memory cells 20 arranged in the same row are mutually connected through a respective word line $WL_j$, wherein j=1, ..., N.

In practice, a respective word line $WL_j$ and a respective bit line $BL_i$ are associated to each memory cell 20.

The memory cells 20 are programmed to store each a respective computational weight $g_{ij}$ that may be used as a weight for performing an in-memory calculation such as a Multiply and Accumulate (MAC) operation.

The line activation circuit 14 provides a plurality of word line activation signals 21, one for each word line $WL_j$, that are configured to each activate the memory cells 20 of a respective word line $WL_j$, as discussed further below in detail.

The line activation circuit 14 receives an input vector X including a plurality of input values $x_1, \ldots, x_N$, one for each word line $WL_j$.

The word line activation signals 21 are pulses, in particular here rectangular pulses, each having a time width that is a function of the respective input value $x_j$.

The biasing circuit 18 generates a bias voltage Vr from a reference current $I_{REF}$ and provides the bias voltage Vr to the bit lines $BL_1, \ldots, BL_M$, as discussed further below in detail. In this embodiment, the biasing circuit 18 provides the same voltage Vr to all the bit lines $BL_1, \ldots, BL_M$. However, the biasing circuit 18 may provide to the bit lines $BL_1, \ldots, BL_M$, in response to the bias voltage Vr, bias voltages different with each other, depending on the specific application.

The digital detectors 16 are analog-to-digital converters (ADC) that are coupled each to a respective bit line $BL_i$ and provide each an output signal $y_i$ by sampling a current $I_{BL,i}$ flowing through the respective bit line $BL_i$.

The memory cells 20 each comprise a storing element 25 and a selection element 26.

The storing element 25 of each memory cell 20 is a variable resistive element, in particular here based on a phase change material (PCM), such as a chalcogenide.

In detail, the computational weight $g_{ij}$ indicates the transconductance value of the storing element 25 of the respective memory cell 20, i.e. it is indicative of the programmed resistance of the storing element 25.

A phase change material has at least two phase states, e.g. an amorphous phase and a crystalline phase, each having a respective resistivity.

A phase change material may be transformed from one phase state to another by means of heat transfer, for example by using current pulses.

The resistance of each storing element 25 associated to the respective phase state is used to distinguish two or more logic states of the corresponding memory cell 20.

For example, the amorphous phase may have a higher resistance than the crystalline phase. A logic state '0', or reset state, may be associated to the amorphous phase of the storing element 25. A logic state '1', or set state, may be associated to the crystalline phase of the storing element 25.

The storing element 25 has a first terminal coupled to a node 28 of the respective bit line $BL_i$ and a second terminal coupled to a reference potential node, here to ground 29, through the selection element 26.

The selection element 26 is a switch, for example a BJT transistor, a diode or a MOS transistor, here an NMOS transistor, that is arranged in series with the respective storing element 25 and whose switching is controlled by the word line activation signal 21 of the respective word line $WL_j$.

In this embodiment, the NMOS transistor forming the selection element 26 has a source coupled to, here directly connected to, the ground 29; a drain coupled to, here directly connected to, the second terminal of the storing element 25; and a gate coupled to, here directly connected to, the respective word line $WL_j$.

In practice, the storing element 25 and the selection element 26 form a current path of the respective memory cell 20; the selection element 26, in response to receiving the respective activation signal 21, closes the respective current path, thereby allowing the passage of a cell current $i_{cell}$ from the common node 28 to the ground 29.

The IMC device 10 may further comprise interface circuits 30 coupled to the bit lines $BL_1, \ldots, BL_M$ that may be used, for example, to program the transconductance values $g_{ij}$ stored in the storing elements 25, in a per se known way.

In detail, the biasing circuit 18 comprises a current source 32 generating the reference current $I_{REF}$ and a reference network 33 having an input node 34 and a reference impedance $Z_{REF}$.

In this embodiment, the current source 32 is a controllable current source which receives an external signal EXT, for example from a user of the IMC device 10, which is indicative of a desired value of the reference current $I_{REF}$.

The reference network 33 receives the reference current $I_{REF}$ at the input node 34. The input node 34 is at a voltage which is a function of the reference current $I_{REF}$ and the reference impedance $Z_{REF}$.

The biasing circuit 18 further comprises a voltage distributing circuit, here formed by an operational amplifier 36 having an output 37 providing the bias voltage Vr.

The operational amplifier 36 has a non-inverting input coupled to the input node 34 of the reference network 33. The operational amplifier 36 has an inverting input coupled to, in particular here directly coupled to, the output 37 of the operational amplifier 36.

The output 37 of the amplifier 36 is coupled to the bit lines $BL_1, \ldots, BL_M$, for example directly or through a specific voltage distribution circuit, depending on the specific application.

In practice, in this embodiment, the voltage at the input node 34 of the reference network 33 forms the bias voltage Vr.

In detail, in this embodiment, the reference network 33 is formed by a reference memory array, therefore also indicated hereinafter by 33, having an overall reference transconductance value $g_{ref}$ and comprising one or more reference cells, here a plurality of reference cells 40, of the non-volatile type.

The reference memory array 33 may be a portion of the memory array 12 or may be a separate memory array.

The reference cells 40 have the same circuit configuration as the memory cells 20 of the memory array 12.

In detail, the reference cells 40 comprise each a storing element 41 and a selection element 42, in particular equal to the storing element 25 and, respectively, the selection element 26 of the memory cells 20.

In practice, the storing element 41 is based on the same technology that is used to obtain the storing element 25. For example, if the storing element 25 is based on a PCM material, then the storing element 41 is also based on a PCM material, in particular the same PCM material.

The reference cells 40 are programmed to store respective reference transconductance values, which may be equal or different to one another, depending on the specific application.

The number of reference cells 40 and the respective reference transconductance values may be chosen, at the design stage, so that the reference memory array 33 is a statistically significant sample of the memory array 12.

In practice, the overall reference transconductance value $g_{ref}$ of the reference memory array 33 statistically represents an overall transconductance of the memory array 12.

For example, the overall transconductance of the memory array 12 may be equal to the transconductance that the memory array 12 would have if all the memory cells 20 are activated at the same time.

For example, the number of reference cells 40 may be higher than one hundred.

For example, the reference cells 40 may be programmed so that the overall reference transconductance $g_{ref}$ of the reference memory array 33 is equal to a mean value of the overall transconductance of the memory array 12.

For example, the mean value may represent the average transconductance value that the memory array 12 has in use, for example as determined during a calibration or initialization step of the IMC device 10.

The storing elements 41 have a first terminal that is coupled to the input node 34 of the reference network 33 and a second terminal coupled to a reference potential node, here to ground 29, through the selection element 42.

In practice, the reference cells 40 all share a same reference bit line $BL_{ref}$.

The selection elements 42 are each formed by a respective switch, for example a BJT transistor, a diode or a MOSFET transistor, here an NMOS transistor, in particular equal to the selection element 26 of the memory cells 20, which is arranged in series with the respective storing element 41.

In this embodiment, the selection elements 42 of all the reference cells 40 are controlled by a same reference activation signal REF, which for example may be generated by the word line activation circuit 14 or by other components of the IMC device 10, here not shown.

However, the selection elements 42 may be controlled each by a respective reference activation signal, different one from the other, for example depending on which reference cells 40 it is intended to activate, during a computation of the IMC device 10.

The reference impedance $Z_{REF}$ is a function of the transconductance values $g_{ref}$ stored by the reference cells 40 and the reference activation signal REF.

Figure 2:
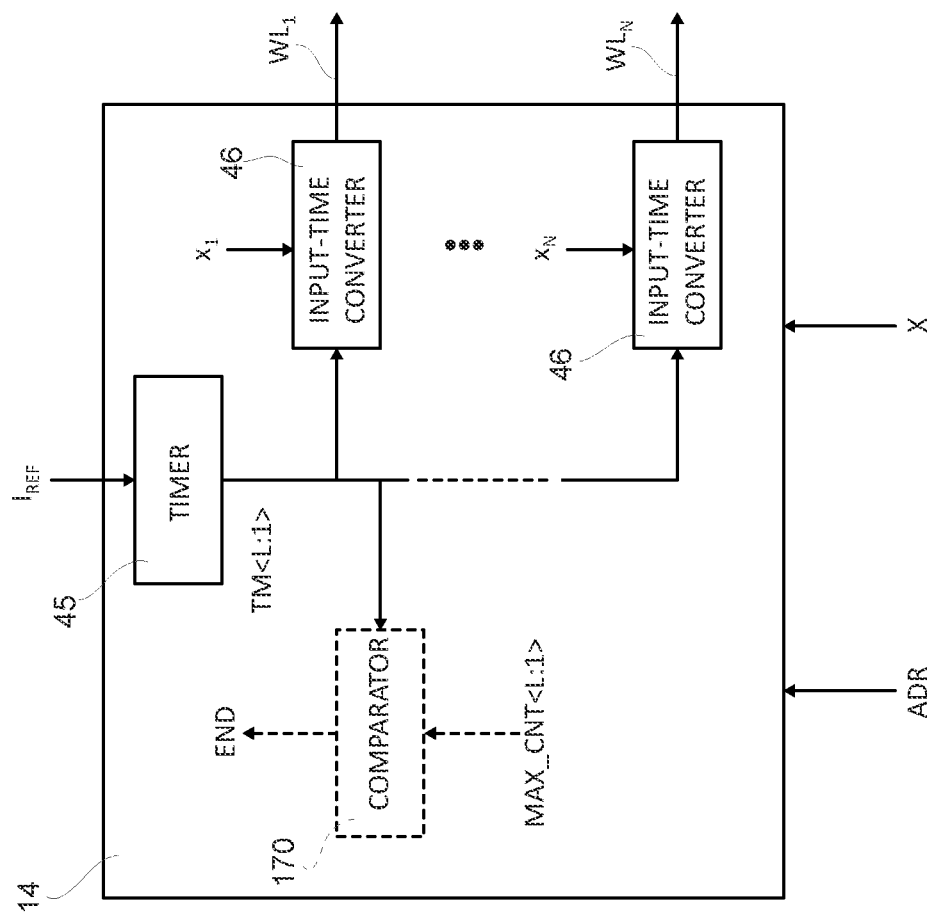
FIG. 2 shows a circuit diagram of a line activation circuit of the in-memory computation device of FIG. 1.

FIG. 2 shows a detailed embodiment of the line activation circuit 14 comprising a timer 45 providing a timer signal TM, and a plurality of input-time converters 46, one for each word line $WL_1, \ldots, WL_N$.

The plurality of input-time converters 46 receive each the timer signal TM and a respective input value $x_j$ and, in response, provide a respective word line activation signal 21.

The line activation circuit 14 further receives an address signal ADR indicating which word lines $WL_j$ to activate for performing an in-memory calculation. For example, the address signal ADR may be used to cause the activation, in use, only of some of the plurality of word lines $WL_1, \ldots, WL_N$, for example if the input vector X has a number of values smaller than the number N of rows of the memory array 12.

In detail, the timer 45 provides the timer signal TM in response to a supply current, in particular here in response to the reference current $I_{REF}$.

The timer signal TM is a digital signal having L bits, also indicated hereinafter and in the figures as timer signal TM<L:1>, which increases in time at an update frequency $f_u$ that is a function of the supply current.

In practice, the timer signal TM is a counter signal.

The timer 45 may reset the timer signal TM to a start value, for example to zero, at the start of a new computation to be performed by the IMC device 10, for example in response to receiving a start signal from a user of the IMC device 10.

An embodiment of the timer 45 will be described in detail with reference to FIGS. 8 and 9.

Figure 3:
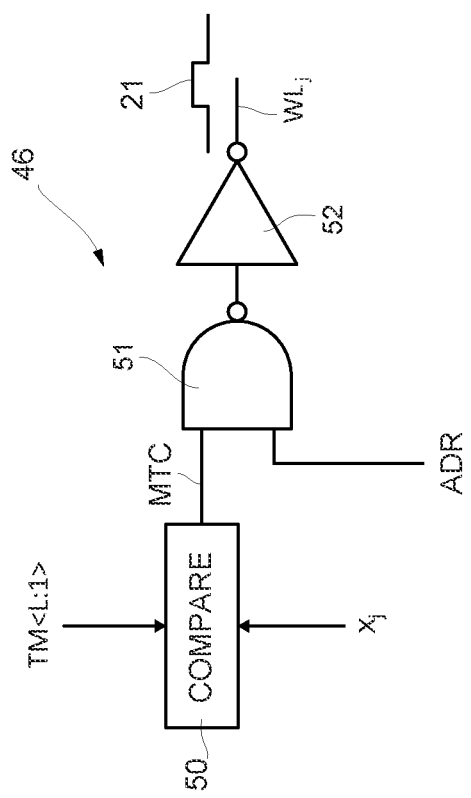
FIG. 3 shows a detailed circuit diagram of a portion of the line activation circuit of FIG. 2.

FIG. 3 shows an embodiment of the input-time converter 46 of a word line $WL_j$ of the plurality of word lines $WL_1, \ldots, WL_M$. The input-time converter 46 comprises a comparator 50 receiving the timer signal TM<L:1> and the respective input value $x_j$ and providing, in response, a match signal MTC; and a pulse generation circuit, here formed by a NAND logic gate 51 and an inverter 52, providing the respective word line activation signal 21.

In this embodiment, the input value $x_j$ is also a digital signal. The comparator 50, for example a bit checking circuit based on a XOR logic gate, compares the input value $x_j$ and the timer signal TM<L:1> and asserts the match signal MTC to the high logic value when the timer signal TM<L:1> becomes equal to the input value $x_j$.

The NAND logic gate 51 receives the match signal MTC and the address signal ADR indicating if the word line $WL_j$ has to be activated during the performance of an in-memory calculation. The address signal ADR_EN may have a high logic value if the word line $WL_j$ has to be activated during the in-memory calculation.

The inverter 52 is coupled at input to the output of the NAND logic gate 51 and provides at output the word line activation signal 21. In practice, the inverter 52 operates as a driver circuit for the respective word line $WL_j$.

With respect to word line $WL_j$, the input-time converter 46 keeps the respective word line activation signal 21 to the high logic value (i.e. thereby here activating the selection elements 26 of the memory cells 20 coupled to the word line $WL_j$) as long as the timer signal TM<L:1> is different from the input value $x_j$.

Therefore, the word line activation signals 21 each have a respective activation length $T_j$ that is proportional to the update frequency $f_u$ of the timer signal TM<L:1> and the respective input value $x_j$.

Figure 4:
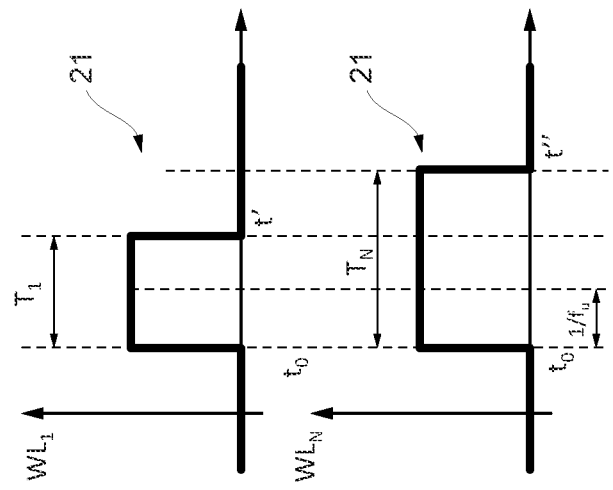
FIG. 4 shows an example of activation signals provided by the portion of FIG. 3.

FIG. 4 shows, by way of example, the word line activation signals 21 of the first word line $WL_1$ and the last word line $WL_N$. At the beginning of a computation by the IMC device 10 (instant to) the timer signal TM is reset to the start value and the input-time converters 46 switch each the respective word line activation signal 21 to the high value.

In the example of FIG. 4, the input value $x_1$ associated to the first word line $WL_1$ is smaller than the input value $x_N$ associated to the last word line $WL_N$; therefore, the input-time converter 46 associated to the first word line $WL_1$ keeps the respective word line activation signal 21 to the high value for a time shorter with respect to the input-time converter 46 associated to the last word line $WL_N$. This results in the word line activation signal 21 of the first word line $WL_1$ having an activation length Ti that is smaller than the activation length TN of the word line activation signal 21 of the last word line $WL_N$.

In use, the IMC device 10 may be used to perform a multiply and accumulate (MAC) operation between the input vector $X=x_1, \ldots, x_N$ and the matrix formed by the computational weights $g_{ij}$.

In fact, the cell current $i_{cell}$ that each memory cell 20 sinks, here from the respective node 28 to ground 29, depends on the transconductance $g_{ij}$ of the respective storing element 25 and the activation time $T_j$ of the respective selection element 26, i.e. on the pulse length of the respective word line activation signal 21.

In detail, the absolute value of each cell current $i_{cell}$ depends on the respective transconductance value $g_{ij}$. The time duration of each cell current $i_{cell}$ depends on the respective activation time $T_j$.

Accordingly, an electric charge may be associated to each cell current $i_{cell}$; said electric charge is a function of the respective transconductance value $g_{ij}$ and the respective activation time $T_j$.

Since the pulse length of the word line activation signals 21 is a function of the respective input value $x_j$, the electric charge associated to each cell current $i_{cell}$ is a function of the product $g_{ij} \cdot x_j$.

For each bit line $BL_i$, the respective bit line current $I_{BL,i}$ is a summation of the cell currents $i_{cell}$. Therefore, the total electric charge associated to each bit line current $I_{BL,i}$ is a function of the multiply and accumulate operation $g_{i1} \cdot x_1 + g_{i2} \cdot x_2 + \ldots + g_{iN} \cdot x_N$.

Accordingly, each output signal $y_i$, which is obtained by measuring the respective bit line current $I_{BL,i}$, in particular by integrating the respective bit line current $I_{BL,i}$, is indicative of the MAC operation $g_{i1} \cdot x_1 + g_{i2} \cdot x_2 + \ldots + g_{iN} \cdot x_N$.

The bit line currents $I_{BL,1}, \ldots, I_{BL,M}$ depend each also on the bias voltage Vr received from the biasing circuit 18.

The fact that the bias voltage Vr is generated from the reference current $I_{REF}$ may allow to adjust the bias voltage Vr by changing the variable impedance reference $Z_{REF}$ and/or the reference current $I_{REF}$.

During the lifetime of the IMC device 10, the IMC device 10 may be subject to a temperature variation that may affect the transconductance values $g_{ij}$ of the memory cells 20. Moreover, the transconductance values $g_{ij}$ of the memory cells 20 may be subject to drifts; for example, in case the memory cells 20 are PCM memory cells, the storing elements 25 may be subject to aging phenomena such as amorphization.

Such deviations of the transconductance values $g_{ij}$ from the programmed values may change the bit line current $I_{BL,i}$, thereby causing errors in the output signal $y_i$.

In the IMC device 10, such temperature variations or drifts would also affect, in the same way, the reference transconductance values of the reference memory cells 40, and, accordingly, the overall reference transconductance value $g_{ref}$ of the reference memory array 33, since the reference memory cells 40 represent a statistically significant sample of the memory cells 20.

A change in the reference transconductance values of the reference memory cells 40 would cause a change in the reference impedance $Z_{REF}$ and, therefore, a change in the voltage at the input node 34 of the reference network 33. Accordingly, also the bias voltage Vr changes. In detail, the change in the bias voltage Vr compensates the change in the transconductance values $g_{ij}$ of the memory cells 20.

For example, if the memory cells 20 undergo a drift that causes an increase in the respective transconductance values $g_{ij}$, the corresponding bit line current $I_{BL,i}$ would also increase. At the same time, also the overall reference transconductance value $g_{ref}$ of the reference memory array 33 would increase, thereby causing a decrease of the reference impedance $Z_{REF}$ and, accordingly, of the bias voltage Vr.

A decrease of the bias voltage Vr causes a decrease of the bit line current $I_{BL,i}$.

In other words, the biasing circuit 18 allows to compensate a change of the bit line currents $I_{BL,i}$ caused by the drift of the transconductance values $g_{ij}$.

Moreover, in this embodiment, since the reference current $I_{REF}$ is generated by the current source 32 and, therefore, is not affected by the drifts of the reference transconductance value $g_{ref}$, the update frequency $f_u$ of the timer signal TM remains constant.

Therefore, the timing of the IMC device 10 remains constant. Consequently, the IMC device 10 has a total elaboration time that is independent from the drifts that may affect the memory cells 20.

Figure 5:
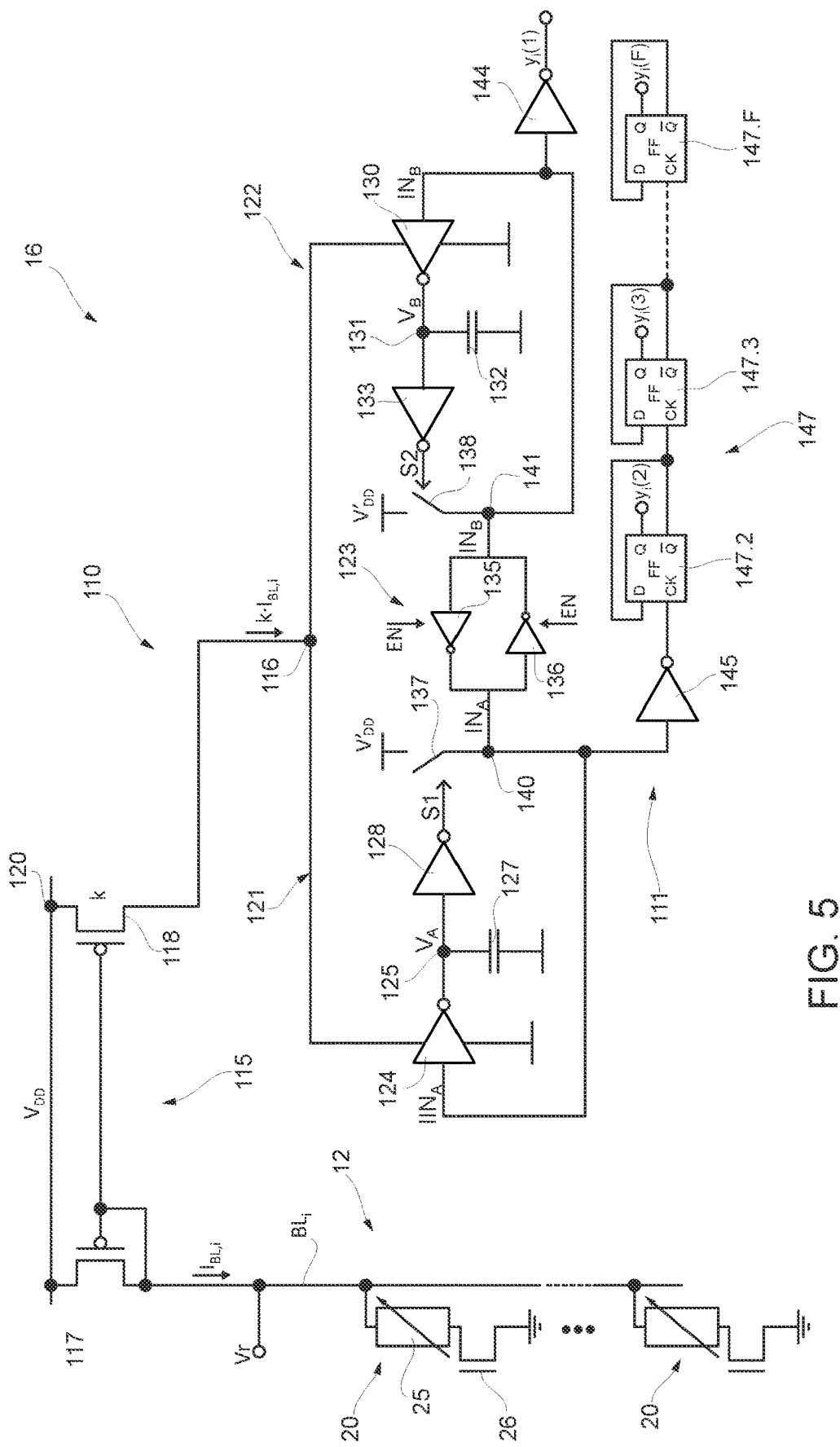
FIG. 5 shows a circuit diagram of a digital detector of the present in-memory computation device.

However, a user of the IMC device 10 may change the timing of the IMC device 10, and therefore the total elaboration time of the IMC device 10, by changing the supply current of the timer 45, i.e. here the reference current $I_{REF}$, for example through the external signal EXT. FIG. 5 shows an embodiment of the digital detectors 16. In detail, the digital detectors 16 are described hereinafter with respect to the digital detector 16 coupled to any bit line $BL_i$ of the plurality of bit lines $BL_1, \ldots, BL_M$.

The digital detector 16 comprises an integration stage 110 and a counter stage 111.

In this embodiment, the integration stage 110 comprises a current mirror 115 that mirrors the bit line current $I_{BL,i}$ of the bit line $BL_i$ into an input node 116 of the respective integration stage 111.

The current mirror 115 has a mirroring ratio 1:k, so that a mirrored bit line current $k \cdot I_{BL,i}$ flows through the input node 116 of the integration stage 110.

In detail, the current mirror 115 has a first branch, here formed by a respective PMOS transistor 117, coupled to the bit line $BL_i$, and a second branch, here formed by a respective PMOS transistor 118, coupled to the respective integration stage 110.

The sources of the PMOS transistors 117, 118 are coupled to a supply node 120, here at a voltage $V_{DD}$, the gates of the PMOS transistors 117, 118 are mutually coupled together and to the drain of the PMOS transistor 117. The drain of the PMOS transistor 118 is coupled to, in particular here is directly connected to, the input node 116 of the integration stage 110.

The integration stage 110 comprises a first integration circuit 121, a second integration circuit 122, and a switching circuit 123 coupled between the first and the second integration circuits 121, 122.

The first and the second integration circuits 121, 122 are coupled to the input node 116 so as to receive the mirrored bit line current $k \cdot I_{BL,i}$.

The first integration circuit 121 comprises a first inverter 124 having an output 125, a capacitor 127 of capacitance $C_A$ coupled at the output 125 of the first inverter 124, and a second inverter 128 whose input is coupled to the output 125 of the first inverter 124.

The first inverter 124 has a supply node coupled to the input node 116 of the integration stage 110 (FIG. 6) and receives at input a first control signal $IN_A$.

In practice, the first inverter 124 is biased by the mirrored bit line current $k \cdot I_{BL,i}$.

The capacitor 127 has a first terminal coupled to the output node 125 of the first inverter 124 and a second terminal coupled to a reference node, here to ground.

The output node 125 of the first inverter 124 is at a first integration voltage $V_A$ that drops across the capacitor 127.

The second inverter 128 has a first sampling threshold, hereinafter referred to as first threshold $V_{th1}$, receives at input the first integration voltage $V_A$ and provides at output a first switch signal S1 as a function of the first threshold $V_{th1}$ and the first integration voltage $V_A$.

In detail, the first switch signal S1 is a logic signal having a high logic value when the first integration voltage $V_A$ is smaller than the first threshold $V_{th1}$, and a low logic value when the first integration voltage $V_A$ is higher than the first threshold $V_{th1}$.

The second integration circuit 122 comprises a first inverter 130 having an output 131, a capacitor 132 of capacitance $C_B$ coupled at the output 131 of the first inverter 130, and a second inverter 133 whose input is coupled to the output 131 of the first inverter 130.

The first inverter 130 has a supply node coupled to the input node 116 of the integration stage 110 (FIG. 6) and receives at input a second control signal $IN_B$.

In practice, the first inverter 130 is biased by the mirrored bit line current $k \cdot I_{BL,i}$. The capacitor 132 has a first terminal coupled to the output node 131 of the first inverter 130 and a second terminal coupled to a reference node, here to ground.

The output node 131 of the first inverter 130 is at a second integration voltage $V_B$ dropping across the capacitor 131.

The second inverter 133 has a second sampling threshold $V_{th2}$, hereinafter referred to as second threshold $V_{th2}$, receives at input the second integration voltage $V_B$ and provides at output a second switch signal S2 as a function of the second threshold $V_{th2}$ and the second integration voltage $V_B$.

In detail, the second switch signal S2 is a logic signal having a high logic value when the second integration voltage $V_B$ is smaller than the second threshold $V_{th2}$, and a low logic value when the second integration voltage $V_B$ is higher than the second threshold $V_{th2}$.

In this embodiment, the first threshold $V_{th1}$ is equal to the second threshold $V_{th2}$; however, the first threshold $V_{th1}$ may be different to the second threshold $V_{th2}$, depending on the specific application.

The switching circuit 123 is a latch formed by two inverters 135, 136 arranged in a ring configuration, a first switch 137 controlled by the first switch signal S1 and a second switch 138 controlled by the second switch signal S2.

The switching circuit 123 has a first node 140 coupled to the input of the inverter 136 and the output of the inverter 135, and a second node 141 coupled to the output of the inverter 136 and the input of the inverter 135.

The first node 140 provides the first control signal $IN_A$. The second node 141 provides the second control signal $IN_B$.

The first switch 137 is coupled between the first node 140 and a node at a voltage $V'_{DD}$, the second switch 138 is coupled between the second node 141 and the node at the voltage $V'_{DD}$.

The voltage $V'_{DD}$ may be equal or different to the voltage $V_{DD}$ of the supply node 120. For example, if the voltage $V'_{DD}$ is different, in particular smaller, than the voltage $V_{DD}$, the digital detector 16 may comprise a voltage scaling circuit, for example a transistor, here not shown, whose source and drain terminals are coupled between the supply node 120 and the input node 116 of the integration stage 110.

In this embodiment, the switching circuit 123 also receives an enable signal EN, which controls the activation of the switching circuit 123. For example, the enable signal EN may be used to keep the switching circuit 123 off when not in use, thereby allowing to optimize power consumption. In addition, the enable signal EN may be used to set the switching circuit 123 in a defined state, for example upon turning on of the IMC device 10.

The charge counter stage 111 is coupled to the first and the second nodes 140, 141 of the switching circuit 123.

In detail, the charge counter stage 111 comprises an inverter 144, whose input is coupled to the second node 141, and a counter comprising an inverter 145 whose input is coupled to the first node 140, and a plurality of D flip-flops 147 including a first flip-flop 147.2, a second flip-flop 147.3 and a last flip-flop 147.F, wherein F is the number of bits of the output signal $y_i$.

In practice, the counter of the charge counter stage 111 has F-1 flip-flops 147.

The output of the inverter 144 provides the first bit $y_i(1)$, i.e. the least significant bit, of the output signal $y_i$.

In other words, the output of the inverter 144 may be used, at the end of a calculation performed by the IMC device 10, as the least significant bit $y_i(1)$ of the output signal $y_i$.

The flip-flops 147 are cascaded one with the other, in sequence from the first flip-flop 147.2 to the last flip-flop 147.F.

The flip-flops 147 each have a clock input (CK-input), a data input (D-input), a Q-output, and a $\overline{Q}$-output.

The CK-input of the first flip-flop 147.2 is coupled to the output of the inverter 145. The $\overline{Q}$-output of the first flip-flop 147.2 is fed back to the D-input of the first flip-flop 147.2. The Q-output of the first flip-flop 147.2 forms the second bit $y_i(2)$ of the output signal $y_i$.

The CK-input of the second flip-flop 147.3 is coupled to the Q-output of the first flip-flop 147.2. The $\overline{Q}$-output of the second flip-flop 147.3 is fed back to the D-input of the second flip-flop 147.3. The Q-output of the second flip-flop 147.3 forms the third bit $y_i(3)$ of the output signal $y_i$.

What is described for the second flip-flop 147.3 applies, mutatis mutandis, to all the subsequent flip-flops, here not shown, up to the F-1-th flip-flop, also not shown.

Finally, the CK-input of the last flip-flop 147.F is coupled to the $\overline{Q}$-output of the F-1-th flip-flop. The $\overline{Q}$-output of the last flip-flop 147.F is fed back to the D-input of the last flip-flop 147.F. The Q-output of the last flip-flop 147.F forms the most significant bit $y_i(F)$ of the output signal $y_i$.

Figure 6:
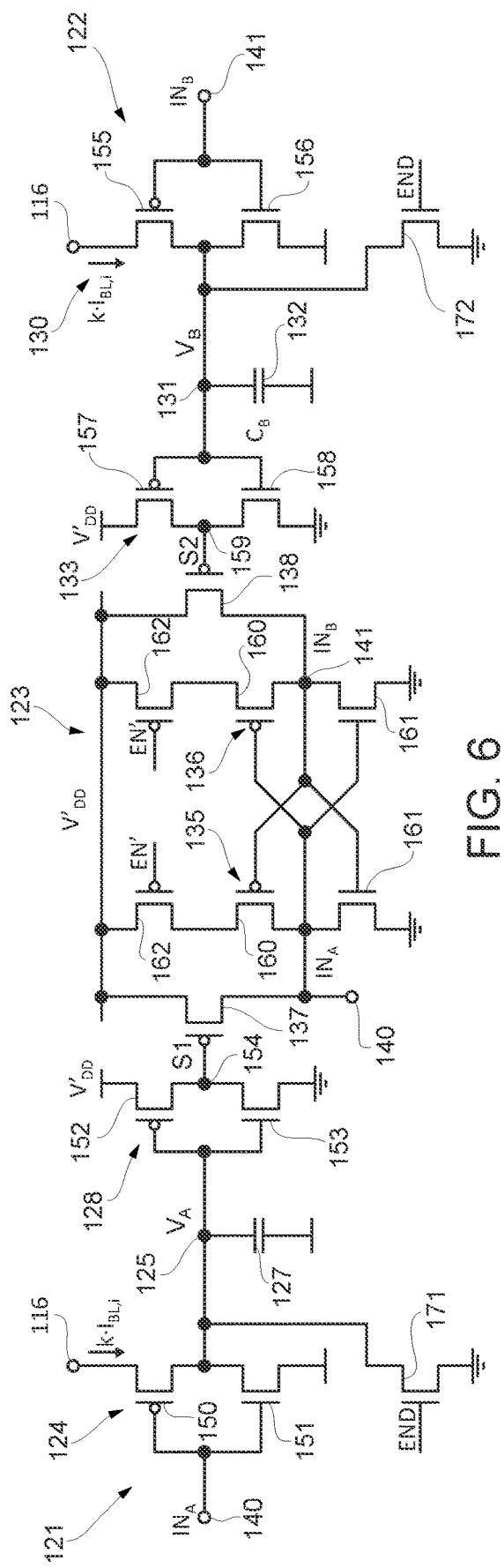
FIG. 6 shows a detailed circuit diagram of a portion of the digital detector of FIG. 5.

With reference to FIG. 6, the first inverter 124 of the first integration circuit 121 is a CMOS inverter formed by the series circuit of a PMOS transistor 150 and an NMOS transistor 151, mutually coupled at the output node 125. The PMOS and NMOS transistors 150, 151 receive the first control signal $IN_A$ at the respective gate terminals.

The source of the PMOS transistor 150 is coupled to the input node 116 of the integration stage 110.

The second inverter 128 of the first integration circuit 121 is a CMOS inverter formed by the series circuit of a PMOS transistor 152 and an NMOS transistor 153, mutually coupled at a node 154 providing the first switch signal S1.

The first threshold $V_{th1}$ of the second inverter 128 is the switching threshold of the second inverter 128, and therefore depends on the properties, for example the threshold or the on-resistance, of the PMOS and NMOS transistors 152, 153. In practice, the switching threshold may be the input voltage for which the output of the inverter has the high logic value or the input voltage for which the output of the inverter has the low logic value.

For example, the switching threshold of the second inverter 128 may be defined as the operating point at which the respective input voltage, i.e. the first integration voltage $V_A$, is equal to the respective output voltage, i.e. the first switch signal S1.

The first inverter 130 of the second integration circuit 122 is a CMOS inverter formed by the series circuit of a PMOS transistor 155 and an NMOS transistor 156, mutually coupled at the output node 131. The PMOS and NMOS transistors 155, 156 receive the second control signal $IN_B$ at the respective gate terminals.

The source of the PMOS transistor 155 is coupled to the input node 116 of the integration stage 110.

The second inverter 133 of the second integration circuit 122 is a CMOS inverter formed by the series circuit of a PMOS transistor 157 and an NMOS transistor 158, mutually coupled at a node 159 providing the second switch signal S2.

The second threshold $V_{th2}$ of the second inverter 133 is the switching threshold of the second inverter 133, i.e. depends on the properties of the PMOS and NMOS transistors 157, 158. For example, the switching threshold depends on the gate-source voltage that allows a current to flow through the source-drain path of the PMOS and NMOS transistors 157, 158.

As shown in the detailed implementation of FIG. 6, the first and the second inverters 135, 136 of the switching circuit 123 are cross-coupled CMOS inverters each comprising a respective PMOS transistor 160 and a respective NMOS transistor 161 mutually coupled in series between a supply node, here at the voltage $V'_{DD}$, and ground.

Moreover, the first and the second inverters 135, 136 of the switching circuit 123 also comprise each a respective enabling switch, here a PMOS transistor 162, that is coupled between the supply node at the voltage $V'_{DD}$ and the PMOS transistor 160 of the respective inverter.

The PMOS transistors 162 are controlled by the enabling signal EN.

In use, the bit line current $I_{BL,i}$ of the bit line $BL_i$ is mirrored into the integration stage 110 of the respective digital detector 16.

Figure 7:
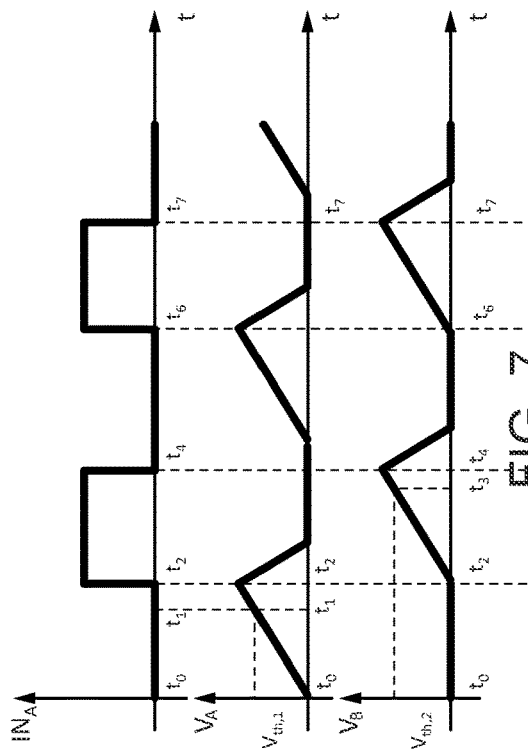
FIG. 7 shows exemplificative waveforms of the digital detector of FIG. 5, in use.

FIG. 7 shows an example of the time behavior of the first control signal $IN_A$, the first integration voltage $V_A$ and the second integration voltage $V_B$ of the digital detector 16 of FIG. 5.

For $t_0 < t < t_1$, the first integration voltage $V_A$ is below the first threshold $V_{th,1}$. Accordingly, the PMOS transistor 152 of the second inverter 128 is on and the NMOS transistor 153 of the second inverter 128 is off. Therefore, the first switch signal S1 (here not shown) has the high value and the first switch 137 is open. The first control signal $IN_A$ has the low value. It follows that, with respect to the first inverter 124 of the first integration circuit 121, for $t_0 < t < t_1$, the PMOS transistor 150 is on and the NMOS transistor 151 is off.

At the same time, for $t_0 < t < t_1$, the second control signal $IN_B$ has the high value. Therefore, with respect to the first inverter 130 of the second integration circuit 122, for $t_0 < t < t_1$, the PMOS transistor 155 is off and the NMOS transistor 156 is on.

Accordingly, the mirrored bit line current $k \cdot I_{BL,i}$ flows, from the input node 116, only through the first inverter 124 of the first integration circuit 121 and not through the first inverter 130 of the second integration circuit 122.

In detail, the mirrored bit line current $k \cdot I_{BL,i}$ flows through the PMOS transistor 150 and charges the capacitor 127. The first integration voltage $V_A$ thus increases in time for $t_0 < t < t_1$.

In detail, in the example of FIG. 7, the first integration voltage $V_A$ increases linearly in time for $t_0 < t < t_1$; however, the behavior of the first integration voltage $V_A$ depends on the specific behavior of the bit line current $I_{BL,i}$ in the time interval $t_0 < t < t_1$.

When the first integration voltage $V_A$ becomes equal to the first threshold voltage $V_{th,1}$, the NMOS transistor 153 of the second inverter 128 turns on and the PMOS transistor 152 turns off.

In this embodiment, the first control signal $IN_A$ assumes the high value at a time instant $t_2$.

The time delay between instants $t_1$ and $t_2$ may correspond, for example, to the propagation delay of the second inverter 128 of the first integration circuit 121 and/or the switching time of the first switch 137.

For $t_1 < t < t_2$, the mirrored bit line current $I_{BL,i}$ keeps charging the capacitor 127; accordingly, the first integration voltage $V_A$ increases up to a maximum value (instant $t_2$).

At the time instant $t_2$, when the first control signal $IN_A$ assumes the high value, the second control signal $IN_B$ (here not shown) assumes the low value (the inverter 136 of the switching circuit 123 receives the first control signal $IN_A$ at input).

While the first control signal $IN_A$ has the high value, the PMOS transistor 150 and the NMOS transistor 151 of the first inverter 124 of the first integration circuit 121 are off and, respectively, on. At the same time, while the second control signal $IN_B$ has the low value, the PMOS transistor 155 and the NMOS transistor 156 of the first inverter 130 of the second integration circuit 122 are on and, respectively, off.

Therefore, for $t > t_2$, the mirrored bit line current $k \cdot I_{BL,i}$ flows, from the input node 116, only through the first inverter 130 of the second integration circuit 122 and not through the first inverter 124 of the first integration circuit 121.

In detail, the mirrored bit line current $k \cdot I_{BL,i}$ flows through the PMOS transistor 155 and charges the capacitor 132 of the second integration circuit 122. The second integration voltage $V_B$ thus increases in time from the time instant $t_2$.

In detail, in the example of FIG. 7, the second integration voltage $V_B$ increases linearly in time for $t > t_2$; however, the behavior of the second integration voltage $V_B$ depends on the specific behavior of the bit line current $I_{BL,i}$.

While the first control signal $IN_A$ has the high value, the capacitor 127 of the first integration circuit 121 discharges through the NMOS transistor 151 of the first inverter 124. The first integration voltage $V_A$ thus decreases to zero.

When the second integration voltage $V_B$ becomes equal to the second threshold voltage $V_{th,2}$ (time instant $t_3$), the NMOS transistor 158 of the second inverter 133 turns on and the PMOS transistor 157 turns off.

Accordingly, at a time instant $t_4$, the second control signal $IN_B$ assumes the high value, similarly to what has been discussed above for the first control signal $IN_A$ in correspondence of time instant $t_2$.

In detail, in response to the second integration voltage $V_B$ reaching the second threshold $V_{th,2}$, the second switch signal S2 switches to the low value and the second switch 138 closes, so that the second node 141 is at the voltage $V'_{DD}$ and, accordingly, the second control signal $IN_B$ assumes the high value.

The time delay between instants $t_3$ and $t_4$ may correspond, for example, to the propagation delay of the second inverter 133 of the second integration circuit 122 and/or the switching time of the second switch 138.

For $t_3 < t < t_4$, the mirrored bit line current $k \cdot I_{BL,i}$ keeps charging the capacitor 132 of the second integration circuit 122; accordingly, the second integration voltage $V_B$ increases up to a maximum value (instant $t_4$).

For $t_2 < t < t_4$, the switching circuit 123 keeps the first control signal $IN_A$ at the high value and the second control signal $IN_B$ at the low value.

At the time instant $t_4$, the first control signal $IN_A$ assumes the low value again, in response to the second control signal $IN_B$ assuming the high value.

In response to the first control signal $IN_A$ assuming the low value, the mirrored bit line current $k \cdot I_{BL,i}$ returns to charging the capacitor 127 of the first integration circuit 121 up to a time instant to, similarly to what has been discussed for $t_1 < t < t_2$.

Consequently, from time instant $t_6$ to time instant $t_7$, the mirrored bit line current $k \cdot I_{BL,i}$ charges the capacitor 132 of the second integration circuit 122 up to a time instant $t_7$, similarly to what has been discussed for $t_2 < t < t_4$.

Again with reference to FIG. 5, the counter stage 111, in particular the flip-flops 147, counts the number of switching events of the first control signal $IN_A$, in particular in this embodiment counts the number of rising edges of the first control signal $IN_A$.

In practice, the digital detectors 16 each measure the bit line current $I_{BL,i}$ of the respective bit line $BL_i$ by performing a number of successive sampling iterations. In each sampling iteration, for example with respect to a sampling iteration wherein the mirrored bit line current $k \cdot I_{BL,i}$ flows through the first integration circuit 121, the integration stage 110 generates the first integration voltage $V_A$ as the time integral of the mirrored bit line current $k \cdot I_{BL,i}$, compares the first integration voltage $V_A$ with the first threshold $V_{th,1}$ and, in response to the first integration voltage $V_A$ reaching the first threshold $V_{th,1}$, resets the first integration voltage $V_A$, in particular here by switching the first control signal $IN_A$. The counter stage 110 updates the respective output signal $y_i$ in response to the first integration voltage $V_A$ reaching the first threshold $V_{th,1}$.

In this embodiment, the least significant bit of the output signal $y_i$ is the value of the second control signal $IN_B$ at the end of the computation performed by the IMC device 10.

In other words, the digital detectors 16 sample each the respective bit line current $I_{BL,i}$ by converting the bit line current $I_{BL,i}$ into a number of charge packets and counting said charge packets, wherein each charge packet corresponds to the charge accumulated on the capacitors 127, 132 that causes a switch of the second inverters 128, 133.

It follows that the capacitors 127, 132 may have a small capacitance if compared to a case wherein the bit line current is integrated all at once onto a single capacitor of capacitance $C_{tot}$. In detail, the capacitance of the capacitors 127, 132 may be smaller than the capacitance $C_{tot}$ by a factor $2^F$, wherein F is the number of bits of the output signal $y_i$.

Therefore, the digital detectors 16 may have a low die area occupancy and, accordingly, the IMC device 10 may have low manufacturing costs.

In addition, the digital detectors 16 each start discretizing the respective bit line current $I_{BL,i}$ while the bit line current $I_{BL,i}$ flows through the respective bit line $BL_i$. Therefore, the output signal $y_i$ may be ready soon after an end of a computation performed by the IMC device 10 or soon after the respective bit line current $I_{BL,i}$ stops.

For example, according to an embodiment, the digital detectors 16 may sample each the respective bit line current $I_{BL,i}$ until the digital detectors 16 receive a stop signal, for example from a user of the IMC device 10 or from the word line activation circuit 14, indicating the end of the computation performed by the IMC device 10.

Therefore, the digital detectors 16 may have a fast measurement time, thereby allowing the IMC device 10 to have a low computation time.

Moreover, according to the illustrated embodiment, the switching circuit 123 disables the first integration circuit 121 and enables the second integration circuit 122, in response to the first integration signal $V_A$ reaching the first threshold $V_{th,1}$, and enables the first integration circuit 121 and disables the second integration circuit 122, in response to the second integration signal $V_B$ reaching the second threshold $V_{th,2}$.

This allows the bit line current $I_{BL,i}$ to be sampled alternatively by the first integration circuit 121 and the second integration circuit 122, thereby allowing the bit line current $I_{BL,i}$ to charge the capacitor 127 while the capacitor 132 is discharging, and to charge the capacitor 132 while the capacitor 127 is discharging. By doing so, no charge may be lost during the sampling and the digital detector 16 may achieve a high measurement accuracy of the bit line current $I_{BL,i}$.

According to an embodiment, again with reference to FIG. 2, the line activation circuit 14 may comprise a computation-end comparator 170, as indicated by a dashed line.

The computation-end comparator 170 receives the timer signal TM<L:1> and a maximum count signal MAX_COUNT<L:1> and provides, in response, an end-count signal END.

The maximum count signal MAX_COUNT<L:1> may be received from a user of the IMC device 10 and indicates the maximum duration of a calculation performed by the IMC device 10. For example, the maximum count signal MAX_COUNT<L:1> may indicate a maximum duration equal to or higher than the time that any of the output signals $y_i$ would take to reach the respective maximum value, e.g. all F bits equal to 1, when all the cells 20 associated to the bit line $BL_i$ are activated. However, the maximum count signal MAX_COUNT<L:1> may indicate a smaller maximum duration, for example if it is desired to obtain a shorter computation time by the IMC device 10.

Again with reference to FIG. 6, the integration stage 110 may further comprise a first and a second stop switches, here a first and a second NMOS transistors 171, 172, indicated by dashed lines, which stop the respective digital detector 16 from sampling the respective bit line current $I_{BL,i}$.

In detail, the first and the second NMOS transistors 171, 172 have a drain terminal coupled to the output nodes 127, 131 of the first and, respectively, the second integration circuits 121, 122; and a source terminal coupled to a reference potential line, here ground. The first and the second NMOS transistors 171, 172 receive, at the respective gate terminals, the end count signal END.

When the timer signal TM<L:1> becomes equal to the maximum count signal MAX_CNT<L:1>, the end-computation comparator 170 switches the end signal END to the high logic value, thereby turning on the first and the second NMOS transistors 171, 172 and short-circuiting the output nodes 127, 131 of the first and the second integration circuits 121, 122 to ground.

Consequently, the first and the second integration circuits 121, 122 stop integrating the bit line current $BL_i$.

In practice, the end-count signal END may be used to determine the end of the MAC calculation by the IMC device 10.

Figure 8:
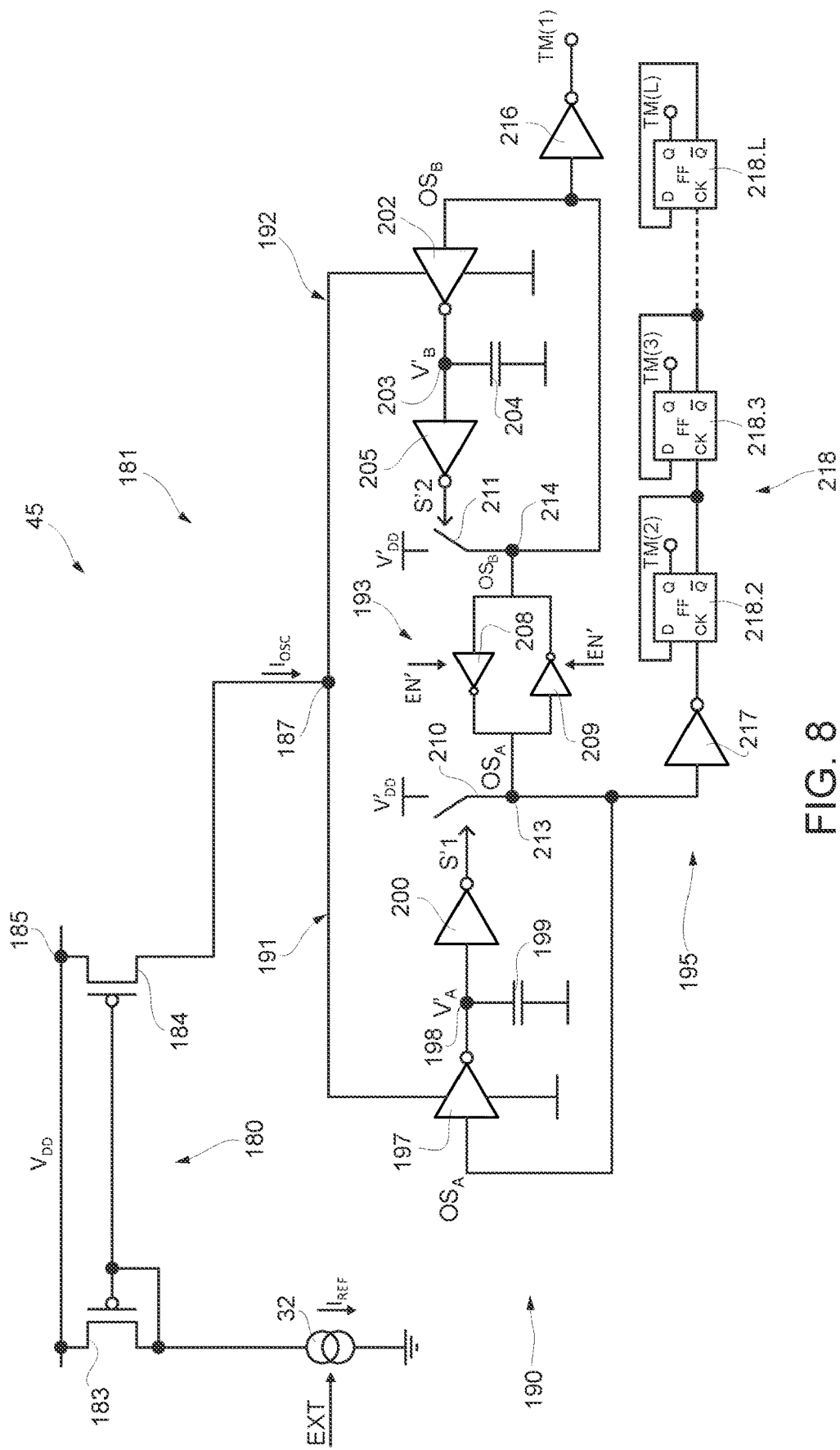
FIG. 8 shows a circuit diagram of a timer of the line activation circuit of FIG. 2.
Figure 9:
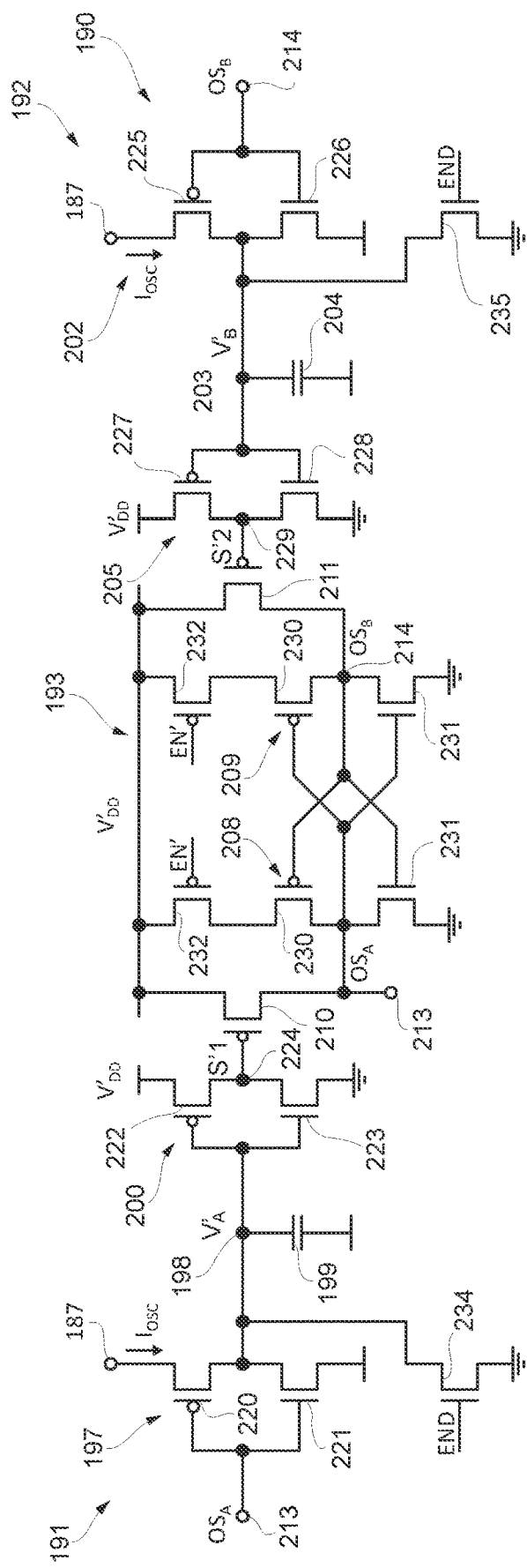
FIG. 9 shows a detailed circuit diagram of a portion of the timer of FIG. 8.

FIGS. 8 and 9 show a circuit diagram of the timer 45 of the line activation circuit 14 of FIG. 2, according to an embodiment.

The timer 45 comprises a current mirror 180 that generates an oscillator current $I_{osc}$ from the reference current $I_{REF}$, and a counting portion 181 that provides the timer signal TM from the oscillator current $I_{osc}$.

The current mirror 180 has a mirroring ratio 1:p, so that the oscillator current $I_{osc}$ is $p \cdot I_{REF}$.

In detail, the current mirror 180 has a first branch, here formed by a respective PMOS transistor 183, coupled to the current source 32, and a second branch, here formed by a respective PMOS transistor 184, coupled to the counting portion 181.

The sources of the PMOS transistors 183, 184 are coupled to a supply node 185, here at the voltage $V_{DD}$, the gates of the PMOS transistors 183, 184 are mutually coupled together and to the drain of the PMOS transistor 183. The drain of the PMOS transistor 184 is coupled to, in particular here is directly connected to, an input node 187 of the counting portion 181.

The counting portion 181 of the timer 45 comprises an integration stage 190, formed here by a first integration circuit 191, a second integration circuit 192 and a switching circuit 193 coupled between the first and the second integration circuits 191, 192, and a counter stage 195 which is coupled to the integration stage 190 and provides the timer signal TM.

The first and the second integration circuits 191, 192 are coupled to the input node 187 so as to receive the oscillator current $I_{osc}$.

The first integration circuit 191 comprises a first inverter 197 having an output 198, a capacitor 199 of capacitance $C'_A$ coupled at the output 198 of the first inverter 197, and a second inverter 200 whose input is coupled to the output 198 of the first inverter 197.

The first inverter 197 has a supply node coupled to the input node 187 of the counting portion 181 (FIG. 9) and receives at input a first oscillator control signal $OS_A$.

In practice, the first inverter 197 is biased by the oscillator current $I_{osc}$.

The capacitor 199 has a first terminal coupled to the output node 198 of the first inverter 197 and a second terminal coupled to a reference potential node, here to ground.

The output node 198 of the first inverter 197 is at a first oscillator integration voltage $V'_A$ that drops across the capacitor 199.

The second inverter 200 has a first oscillator threshold $V'_{th1}$, hereinafter simply referred to as first threshold $V'_{th,1}$, receives at input the first oscillator integration voltage $V'_A$ and provides at output a first oscillator switch signal S'1 as a function of the first threshold $V'_{th1}$ and the first oscillator integration voltage $V'_A$.

In detail, when the first oscillator integration voltage $V'_A$ is smaller than the first threshold $V'_{th1}$, the first oscillator switch signal S'1 has a high logic value. When the first oscillator integration voltage $V'_A$ is higher than the first threshold $V'_{th1}$, the first oscillator switch signal S'1 has a low logic value.

The second integration circuit 192 comprises a first inverter 202 having an output 203, a capacitor 204 of capacitance $C'_B$ coupled at the output 203 of the first inverter 202, and a second inverter 205 whose input is coupled to the output 203 of the first inverter 202.

The first inverter 202 has a supply node coupled to the input node 187 of the counting portion 181 (FIG. 9) and receives at input a second oscillator control signal $OS_B$.

In practice, the first inverter 202 is biased by the oscillator current $I_{osc}$.

The capacitor 204 has a first terminal coupled to the output node 203 of the first inverter 202 and a second terminal coupled to a reference potential node, here to ground.

The output node 203 of the first inverter 202 is at a second oscillator integration voltage $V'_B$ dropping across the capacitor 204.

The second inverter 205 has a second oscillator threshold $V'_{th2}$, hereinafter simply referred to as second threshold $V'_{th,2}$, receives at input the second oscillator integration voltage $V'_B$ and provides at output a second oscillator switch signal S'2 as a function of the second threshold $V'_{th2}$ and the second oscillator integration voltage $V_B$.

In detail, when the second oscillator integration voltage $V_B$ is smaller than the second threshold $V'_{th2}$, the second oscillator switch signal S'2 has a high logic value. When the second oscillator integration voltage V' B is higher than the second threshold $V'_{th2}$, the second oscillator switch signal S'2 has a low logic value.

In this embodiment, the first threshold $V'_{th1}$ of the second inverter 200 is equal to the first threshold $V_{th1}$ of the second inverter 128 of the digital detectors 16 (FIGS. 5 and 6). The second threshold $V'_{th2}$ of the second inverter 205 is equal to the second threshold $V_{th2}$ of the second inverter 133 of the digital detectors 16 (FIGS. 5 and 6).

Again with reference to FIG. 8, the switching circuit 193 is a latch formed by two inverters 208, 209 arranged in a ring configuration, a first switch 210 controlled by the first oscillator switch signal S'1 and a second switch 211 controlled by the second oscillator switch signal S'2.

The switching circuit 193 has a first node 213 coupled to the input of the inverter 209 and the output of the inverter 208, and a second node 214 coupled to the output of the inverter 209 and the input of the inverter 208.

The first node 213 provides the first oscillator control signal $OS_A$. The second node 214 provides the second oscillator control signal $OS_B$.

The first switch 210 is coupled between the first node 213 and a node at the voltage $V'_{DD}$, the second switch 211 is coupled between the second node 214 and the node at the voltage $V'_{DD}$.

According to an embodiment, the voltage V'$_{DD}$ of the counting portion 181 of the timer 45 may be equal to the voltage V'$_{DD}$ of the integration stage 110 of the digital detector 16 (FIG. 5).

In the embodiment of FIG. 8, the switching circuit 193 also receives an oscillator enable signal EN', which controls the activation of the switching circuit 193. For example, the oscillator enable signal EN' may be used to keep the switching circuit 193 off when not in use, thereby allowing to optimize power consumption. In addition, the enable signal EN' may be used to set the switching circuit 193 in a defined state, for example upon turning on of the IMC device 10.

The counter stage 195 is coupled to the first and the second nodes 213, 214 of the switching circuit 193.

In detail, the charge counter stage 195 comprises an inverter 216, whose input is coupled to the second node 214, and a counter comprising an inverter 217 whose input is coupled to the first node 213 and a plurality of D flip-flops 218 including a first flip-flop 218.2, a second flip-flop 218.3 and a last flip-flop 218.L, wherein L is the number of bits of the timer signal TM<L:1>.

In practice, the counter of the charge counter stage 195 has L-1 flip-flops 218.

The output of the inverter 216 provides the first bit TM(1), i.e. the least significant bit, of the timer signal TM.

The flip-flops 218 are cascaded one with the other, in sequence from the first flip 218.2 to the last flip-flop 218.L.

The flip-flops 218 each have a clock input (CK-input), a data input (D-input), a Q-output, and a $\overline{Q}$-output.

The CK-input of the first flip-flop 218.2 is coupled to the output of the inverter 217. The $\overline{Q}$-output of the first flip-flop 218.2 is fed back to the D-input of the first flip-flop 218.2. The Q-output of the first flip-flop 218.2 forms the second bit TM(2) of the timer signal TM<L:1>.

The CK-input of the second flip-flop 218.3 is coupled to the $\overline{Q}$-output of the first flip-flop 218.2. The $\overline{Q}$-output of the second flip-flop 218.3 is fed back to the D-input of the second flip-flop 218.3. The Q-output of the second flip-flop 218.3 forms the third bit TM(3) of the timer signal TM<L:1>.

What is described for the second flip-flop 218.3 applies, mutatis mutandis, to all the subsequent flip-flops, here not shown, up to the L-1-th flip-flop, also not shown.

Finally, the CK-input of the last flip-flop 218.L is coupled to the $\overline{Q}$-output of the L-1-th flip-flop. The $\overline{Q}$-output of the last flip-flop 218.L is fed back to the D-input of the last flip-flop 218.L. The Q-output of the last flip-flop 218.L forms the most significant bit TM(L) of the timer signal TM<L:1>.

With reference to the detailed implementation of the integration stage 190 shown in FIG. 9, the first inverter 197 of the first integration circuit 191 is a CMOS inverter formed by the series circuit of a PMOS transistor 220 and an NMOS transistor 221, mutually coupled at the output node 198. The PMOS and NMOS transistors 220, 221 receive the first oscillator control signal OS$_A$ at the respective gate terminals.

The source of the PMOS transistor 220 is coupled to the input node 187 of the integration stage 190 of the timer 45.

The second inverter 200 of the first integration circuit 191 is a CMOS inverter formed by the series circuit of a PMOS transistor 222 and an NMOS transistor 223, mutually coupled at a node 224 providing the first oscillator switch signal S'1.

The first threshold V'$_{th1}$ of the second inverter 200 is the switching threshold of the second inverter 200, and therefore depends on the properties, for example the threshold or the on-resistance, of the PMOS and NMOS transistors 222, 223. In practice, the switching threshold may be the input voltage for which the output of the inverter has the high logic value or the input voltage for which the output of the inverter has the low logic value.

For example, the switching threshold of the second inverter 200 may be defined as the operating point at which the respective input voltage, i.e. the first oscillator integration voltage V'$_A$, is equal to the respective output voltage, i.e. the first oscillator switch signal S'1.

The first inverter 202 of the second integration circuit 192 is a CMOS inverter formed by the series circuit of a PMOS transistor 225 and an NMOS transistor 226, mutually coupled at the output node 203. The PMOS and NMOS transistors 225, 226 receive the second oscillator control signal OS$_B$ at the respective gate terminals.

The source of the PMOS transistor 225 is coupled to the input node 187 of the counting portion 190 of the timer 45.

The second inverter 205 of the second integration circuit 192 is a CMOS inverter formed by the series circuit of a PMOS transistor 227 and an NMOS transistor 228, mutually coupled at a node 229 providing the second oscillator switch signal S'2.

The second threshold V'$_{th2}$ of the second inverter 205 is the switching threshold of the second inverter 205, and therefore depends on the properties, for example the threshold or the on-resistance, of the PMOS and NMOS transistors 227, 228. In practice, the switching threshold may be the input voltage for which the output of the inverter has the high logic value or the input voltage for which the output of the inverter has the low logic value.

For example, the switching threshold of the second inverter 205 may be defined as the operating point at which the respective input voltage, i.e. the second oscillator integration voltage V'$_B$, is equal to the respective output voltage, i.e. the second oscillator switch signal S'2.

As shown in the detailed implementation of FIG. 9, the first and the second inverters 208, 209 of the switching circuit 193 are cross-coupled CMOS inverters each comprising a respective PMOS transistor 230 and a respective NMOS transistor 231 mutually coupled in series between a supply node, here at the voltage V'$_{DD}$, and ground.

Moreover, the first and the second inverters 208, 209 of the switching circuit 193 also comprise each a respective enabling switch, here a PMOS transistor 232, that is coupled between the supply node at the voltage V'$_{DD}$ and the PMOS transistor 230 of the respective inverter.

The PMOS transistors 232 are controlled by the oscillator enabling signal EN'.

In this embodiment, the timer 45 comprises, with reference to FIG. 9, a first and a second stop switches, here a first and a second NMOS transistors 234, 235, that are configured to stop the timer 45 from updating the timer signal TM.

In detail, the first and the second NMOS transistors 234, 235 have a drain terminal coupled to the output nodes 198, 203 of the first and, respectively, the second integration circuits 191, 192; and a source terminal coupled to a reference, here ground. The first and the second NMOS transistors 234, 235 receive, at the respective gate terminals, the end-count signal END.

When the end-computation comparator 195 (FIG. 2) switches the end signal END to the high logic value, the first and the second NMOS transistors 234, 235 are switched on, thereby short-circuiting the output nodes 198, 203 of the first and the second integration circuits 191, 192 to ground.

Consequently, the timer 45 stops updating the timer signal TM.

In practice, in this embodiment, the timer 45, in particular the respective integration stage 181, has a circuit diagram that is equal to the circuit diagram of any one of the digital detectors 16 of FIG. 5, in particular of the respective integration stage 110.

It follows that the timer 45 generates the timer signal TM<L:1> from the oscillator current $I_{osc}$ in the same way as any one of the digital detectors 16 generates the output signal $y_i$ from the respective bit line current $I_{BL,i}$.

Thus, the timer 45 generates the timer signal TM<L:1> by performing a number of successive timing iterations. In each timing iteration, for example with respect to a timing iteration wherein the oscillator current $I_{osc}$ flows through the first integration circuit 191, the integration stage 190 generates the first integration oscillation voltage $V'_A$ as the time integral of the oscillator current $I_{osc}$, compares the first oscillator integration voltage $V'_A$ with the first threshold $V'_{th,1}$ and, in response to the first oscillator integration voltage $V'_A$ reaching the first threshold $V'_{th,1}$, resets the first oscillator integration voltage $V'_A$, in particular here by switching the first oscillator control signal $OS_A$. The counter stage 195 updates the timer signal TM<L:1> in response to the first oscillator integration voltage $V'_A$ reaching the first threshold $V'_{th,1}$.

In this embodiment, the least significant bit of the timer signal TM is the value of the second oscillator control signal $OS_B$.

In other words, the timer 45 samples the oscillator current $I_{osc}$ by converting the oscillator current $I_{osc}$ into a number of charge packets and counting said charge packets, wherein each charge packet corresponds to the charge accumulated on the capacitors 199, 204 that causes a switch of the second inverters 200, 205.

It follows that the update frequency $f_u$ of the timer signal TM<L:1> is given by the frequency of the switching events of the first oscillator control signal $OS_A$ (similarly to what is discussed for the first control signal $IN_A$ with reference to FIG. 5). The update frequency $f_u$ thus depends on the value of the oscillator current $I_{osc}$, i.e. on the reference current $I_{REF}$ and the mirror factor p of the current mirror 180, the capacitances $C'_A$, $C'_B$, and the first and second thresholds $V'_{th,1}$, $V'_{th,2}$ of the second inverters 200, 205.

In practice, the integration stage 110 of the timer 45 behaves as a current-controlled oscillator.

In use, the fact that the timer 45 generates the timer signal TM<L: 1> from the oscillator current $I_{osc}$ in the same way as the digital detectors 16 each generate the respective output signal $y_i$ from the respective bit line current $I_{BL,i}$, in particular the fact that the respective integration circuits 110, 181 have the same circuit diagram, allows to obtain a strong correlation between the timer signal TM<L:1> and the output signals $y_1, \ldots, y_M$.

Therefore, global variations that may affect the IMC device 10, such as drifts of the supply voltages $V_{DD}$, $V'_{DD}$ and/or temperature variations, are compensated by the timer 45 and the digital detectors 16, without thereby affecting the precision of the MAC operation performed by the IMC device 10.

By changing the oscillator current $I_{osc}$, for example by changing the reference current $I_{REF}$ through the external signal EXT, it is possible to modify the update frequency $f_u$ of the timer signal TM<L:1> and, therefore the total computation time of the IMC device 10.

In fact, for example, an increase of the oscillator current $I_{osc}$ implies that the oscillator integration voltages $V'_A$, $V'_B$ (FIGS. 8 and 9) increase faster; accordingly, the first and the second oscillator control signals $OS_A$, $OS_B$ switch faster, thereby also increasing the update frequency $f_u$ of the timer signal TM<L:1>.

Figure 10:
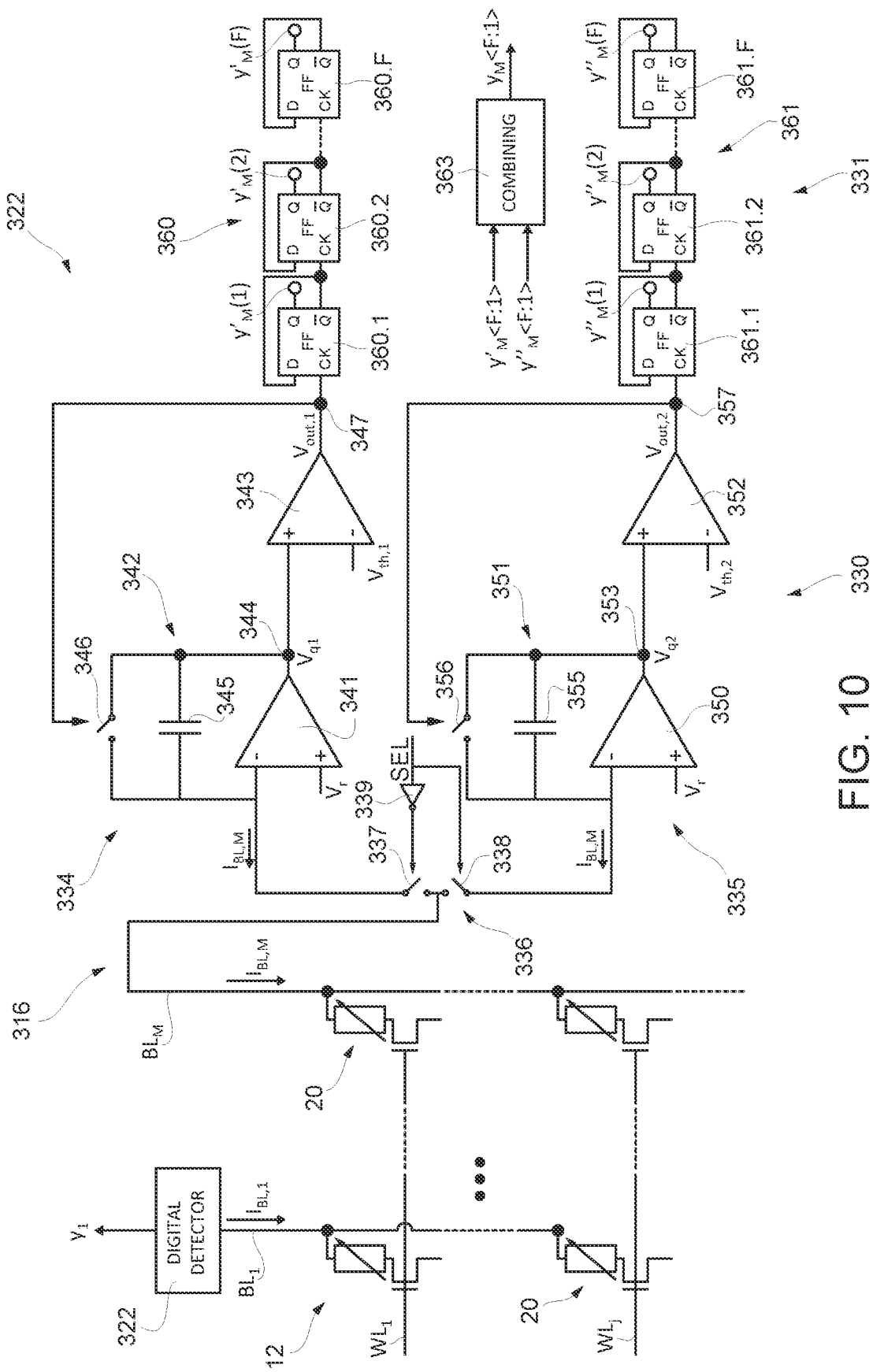
FIG. 10 shows a circuit diagram of a digital detector of the present in-memory computation device.

FIG. 10 shows a different embodiment of the digital detectors, here indicated by 322.

By way of example, the digital detectors 322 will be described hereinafter with respect to the digital detector 322 of the bit line $BL_M$, which is shown in detail in FIG. 10.

The digital detector 322 comprises an integration stage 330 and a counter stage 331.

The integration stage 330 comprises a first integration circuit 334, a second integration circuit 335, and a switching circuit 336 coupled between the first and the second integration circuits 334, 335.

In detail, the switching circuit 336 comprises a first switch 337 and a second switch 338 that couple the bit line $BL_M$ to the first integration circuit 334 and, respectively, to the second integration circuit 335.

The first and the second switches 337, 338 are controlled by a selection signal SEL so that if the first switch 337 is open then the second switch 338 is closed and if the first switch 337 is closed then the second switch 338 is open.

In detail, in this embodiment, the switching circuit 336 further comprises an inverter 339 that receives the selection signal SEL and is coupled at output to the first switch 337.

In practice, the switching circuit 336 allows the bit line current $I_{BL,M}$ to flow either through the first integration circuit 334 or through the second integration circuit 335.

The first integration circuit 334 comprises a first operational amplifier 341, a feedback circuit 342, and a second operational amplifier 343.

The first operational amplifier 341 has an inverting input coupled to the first switch 337 of the switching circuit 336, receives the bias voltage Vr from the biasing circuit 18 (FIG. 1) at a non-inverting input, and has an output 344 providing a voltage $V_{q1}$.

The feedback circuit 342 is coupled between the inverting input and the output 344 of the first operational amplifier 341 and is formed by a parallel circuit comprising a feedback capacitor 345 and a switch 346.

The second operational amplifier 343 has the non-inverting input coupled to the output 344 of the first operational amplifier 341, receives the first sampling threshold voltage $V_{th,1}$ at the inverting input, and has an output 347 providing a first output voltage $V_{out1}$.

The commutation of the switch 346 is controlled by the first output voltage $V_{out,1}$.

The second integration circuit 335 comprises a first operational amplifier 350, a feedback circuit 351, and a second operational amplifier 352.

The first operational amplifier 350 has an inverting input coupled to the second switch 338 of the switching circuit 336, receives the bias voltage Vr from the biasing circuit 18 (FIG. 1) at a non-inverting input, and has an output 353 providing a voltage $V_{q2}$.

The feedback circuit 351 is coupled between the inverting input and the output 353 of the first operational amplifier 350 and is formed by a parallel circuit comprising a feedback capacitor 355 and a switch 356.

The second operational amplifier 352 has the non-inverting input coupled to the output 353 of the first operational amplifier 350, receives the second sampling threshold voltage $V_{th,2}$ at the inverting input, and has an output 357 providing a second output voltage $V_{out,2}$.

The commutation of the switch 356 is controlled by the second output voltage $V_{out,2}$.

The first and the second threshold voltages $V_{th,1}$, $V_{th,2}$ are here equal; however, the first and the second threshold voltages $V_{th,1}$, $V_{th,2}$ may be different one from the other.

The charge counter stage 331 comprises a first counting circuit, here formed by a plurality of flip-flops 360, coupled to the first integration circuit 334, and providing a first intermediate output signal $y'_M$; and a second counting circuit, here formed by a plurality of flip-flops 361, coupled to the second integration circuit 335, and providing a second intermediate output signal $y''_M$.

In detail, the flip-flops 360 are D flip-flops and include a first flip-flop 360.1, a second flip-flop 360.2 and a last flip-flop 360.F, wherein F is the number of bits of the first intermediate output signal $y'_M$.

The flip-flops 360 are cascaded one with the other, in sequence from the first flip-flop 360.1 to the last flip-flop 360.F.

The flip-flops 360 each have a clock input (CK-input), a data input (D-input), a Q-output, and a $\overline{Q}$-output.

The CK-input of the first flip-flop 360.1 is coupled to the output 347 of the second operational amplifier 343. The $\overline{Q}$-output of the first flip-flop 360.1 is fed back to the D-input of the first flip-flop 360.1. The Q-output of the first flip-flop 360.1 forms the least significant bit $y'_M(1)$ of the first intermediate output signal $y'_M$.

The CK-input of the second flip-flop 360.1 is coupled to the $\overline{Q}$-output of the first flip-flop 360.1. The $\overline{Q}$-output of the second flip-flop 360.2 is fed back to the D-input of the second flip-flop 360.2. The Q-output of the second flip-flop 360.2 forms the second bit $y'_M(2)$ of the first intermediate output signal $y'_M$.

What is described for the second flip-flop 360.2 applies, mutatis mutandis, to all the subsequent flip-flops 360, here not shown, up to the F-1-th flip-flop, also not shown.

Finally, the CK-input of the last flip-flop 360.F is coupled to the $\overline{Q}$-output of the F-1-th flip-flop. The $\overline{Q}$-output of the last flip-flop 360.F is fed back to the D-input of the last flip-flop 360.F. The Q-output of the last flip-flop 360.F forms the most significant bit $y'_M(F)$ of the first intermediate output signal $y'_M$.

The flip-flops 361 are D flip-flops and include a first flip-flop 361.1, a second flip-flop 361.2 and a last flip-flop 361.F, wherein F is the number of bits of the second intermediate output signal $y''_M$.

The flip-flops 361 are cascaded one with the other, in sequence from the first flip-flop 361.1 to the last flip-flop 361.F.

The flip-flops 361 each have a clock input (CK-input), a data input (D-input), a Q-output, and a $\overline{Q}$-output.

The CK-input of the first flip-flop 361.1 is coupled to the output 357 of the second operational amplifier 352. The Q-output of the first flip-flop 361.1 is fed back to the D-input of the first flip-flop 361.1. The Q-output of the first flip-flop 361.1 forms the least significant bit $y''_M(1)$ of the second intermediate output signal $y''_M$.

The CK-input of the second flip-flop 361.1 is coupled to the $\overline{Q}$-output of the first flip-flop 361.1. The Q-output of the second flip-flop 361.2 is fed back to the D-input of the second flip-flop 361.2. The Q-output of the second flip-flop 361.2 forms the second bit $y''_M(2)$ of the second intermediate output signal $y''_M$.

What is described for the second flip-flop 361.2 applies, mutatis mutandis, to all the subsequent flip-flops 361, here not shown, up to the F-1-th flip-flop, also not shown.

Finally, the CK-input of the last flip-flop 361.F is coupled to the $\overline{Q}$-output of the F-1-th flip-flop. The $\overline{Q}$-output of the last flip-flop 361.F is fed back to the D-input of the last flip-flop 361.F. The Q-output of the last flip-flop 361.F forms the most significant bit $y'''_M(F)$ of the second intermediate output signal $y''_M$.

The digital detector 322 further comprises a combination circuit 363 that receives the first intermediate output signal $y'_M$ from the flip-flops 360 and the second intermediate output signal $y''_M$ from the flip-flops 361 and provide, in response, the output signal $y_M$. For example, the combination circuit 363 may provide the output signal $y_M$ by summing the first and the second intermediate output signals $y'_M$, $y''_M$.

In use, the switching circuit 336 makes the bit line current $I_{BL,M}$ to flow either in the first or in the second integration circuit 334, 335.

Figure 11:
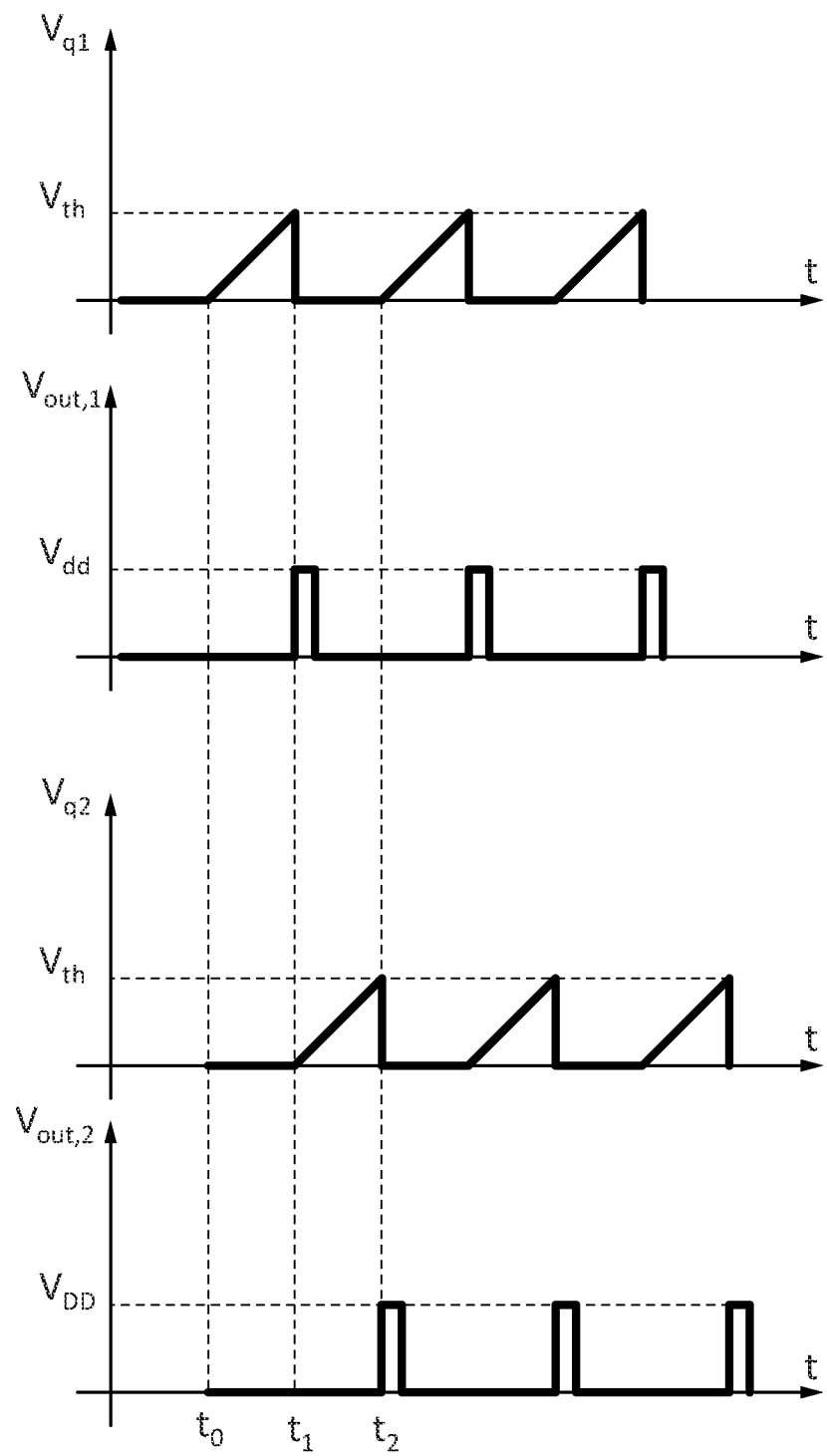
FIG. 11 shows an example of waveforms of the digital detector of FIG. 10, in use.

With reference to the exemplificative waveforms of FIG. 11, at $t_0$, the first switch 337 is closed and the second switch 338 is open.

Thus, the bit line $BL_M$ is biased by the bias voltage Vr at the non-inverting input of the first operational amplifier 341 of the first integration circuit 334.

Moreover, at $t_0$, the first output voltage $V_{out,1}$ and the second output voltage $V_{out,2}$ have the low logic value, thereby keeping the switches 346, 356 open.

The bit line current $I_{BL,M}$ charges the capacitor 345 of the first integration circuit 334. Thus, the voltage $V_{q1}$ at the output 344 of the first operational amplifier 341 increases in time.

When the voltage $V_{q1}$ reaches the threshold voltage $V_{th}$ (instant $t_1$), the second operational amplifier 343 switches the first output voltage $V_{out,1}$ to the high logic value, here to $V_{DD}$.

In response, the switch 346 closes, thereby discharging the capacitor 345 of the first integration circuit 334. Accordingly, the voltage $V_{q1}$ at the output 344 decreases.

Moreover, in response to the first output voltage $V_{out,1}$ assuming the high logic value, the selection signal SEL switches, thereby opening the first switch 337 and closing the second switch 338 of the switching circuit 336.

Therefore, at instant $t_1$, the bit line $BL_M$ is coupled to the second integration circuit 335 and biased by the read voltage Vr at the non-inverting input of the first operational amplifier 350.

The bit line current $I_{BL,M}$ flows through the second integration circuit 335, thereby charging the respective capacitor 355. The voltage $V_{q2}$ at the output 353 of the first operational amplifier 350 increases.

When the voltage $V_{q2}$ reaches the threshold voltage $V_{th}$ (instant $t_2$), the second operational amplifier 352 switches the second output voltage $V_{out,2}$ to the high logic value, here to $V_{DD}$.

In response, the switch 356 closes, thereby discharging the capacitor 355 of the second integration circuit 335. Accordingly, the voltage $V_{q2}$ at the output 353 decreases.

Moreover, in response to the first output voltage $V_{out,1}$ assuming the high logic value, the selection signal SEL switches, thereby opening the first switch 337 and closing the second switch 338 of the switching circuit 336.

Therefore, similarly to what has been discussed above with reference to the instant $t_1$, at the instant $t_2$ the bit line current $I_{BL,M}$ flows again through the first integration circuit 334. The voltage $V_{q1}$ thus starts increasing.

The flip-flops 360 count the number of rising events of the first output voltage $V_{out,1}$, i.e. the number of times the voltage $V_{q1}$ becomes equal to the threshold voltage $V_{th}$.

The flip-flops 361 count the number of rising events of the second output voltage $V_{out,2}$, i.e. the number of times the voltage $V_{q2}$ becomes equal to the threshold voltage $V_{th}$.

In practice, also in this embodiment, the digital detectors 322 each measure the bit line current $I_{BL,i}$ of the respective bit line $BL_i$ by performing a number of successive respective sampling iterations. In each sampling iteration, for example with respect to a sampling iteration wherein the bit line current $I_{BL,i}$ flows through the first integration circuit 334, the integration stage 330 generates the integration voltage $V_{q1}$ as the time integral of the bit line current $I_{BL,i}$, compares the integration voltage $V_{q1}$ with the first threshold $V_{th,1}$ and, in response to the integration voltage $V_{q1}$ reaching the first threshold $V_{th,1}$, resets the integration voltage $V_{q1}$, in particular here by closing the switch 346. The counter stage 331 updates the output signal $y_i$ in response to the integration voltage $V_{q1}$ reaching the first threshold $V_{th,1}$.

Similarly to what is discussed for the capacitors 127, 132 of the digital detectors 16 (FIG. 5), the capacitors 345, 355 may have a small capacitance value and the bit line current $I_{BL,i}$ may be measured while the bit line current $I_{BL,i}$ flows through the respective bit line $BL_i$.

It is clear that the IMC device 10 may be subject to modifications and variations without departing the scope of the present invention, as defined in the attached claims.

The memory cells 20 may be resistive memory cells not based on PCM materials, but on different technologies; for example, may be magnetoresistive (MRAM), resistive (RRAM) or static (SRAM) memory cells.

Moreover, the storing element 25 of each memory cell 20 may be formed by a plurality of selectable resistive elements, equal or different from each other, mutually arranged in parallel, for example between the respective bit line and ground, that may be selectively enabled or disabled during programming of the memory array 12, so that the respective transconductance value $g_{ij}$ may be a multibit value.

For example, the reference impedance $Z_{REF}$ of the reference network 33 of FIG. 1 may be a variable impedance, for example controllable by a user in response to a drift of the memory cells 20, that is obtained in a different way from what is shown, i.e. may not comprise the reference memory cells 40.

For example, the timer 45 may be a current-controlled timer different from what shown in FIGS. 8 and 9. For example, the timer 45 may be based on a different current-controlled oscillator, e.g. a ring oscillator having an odd number of inverters.

For example, the timer signal TM may be an analog signal and the input-time converters 46 may be configured to convert the respective input value $x_j$ into an analog signal and compare said analog input signal with the analog timer signal. For example, the timer signal may be a voltage ramp generated from a current, in particular from the reference current $I_{REF}$; in this case, the update frequency of the analog timer signal is indicative of the slope of the voltage ramp.

In alternative, the timer of the word line activation circuit 14 may provide the timer signal TM in a different way, for example not in response to a current, e.g. the timer may be based on a voltage-controlled timer.

Figure 12:
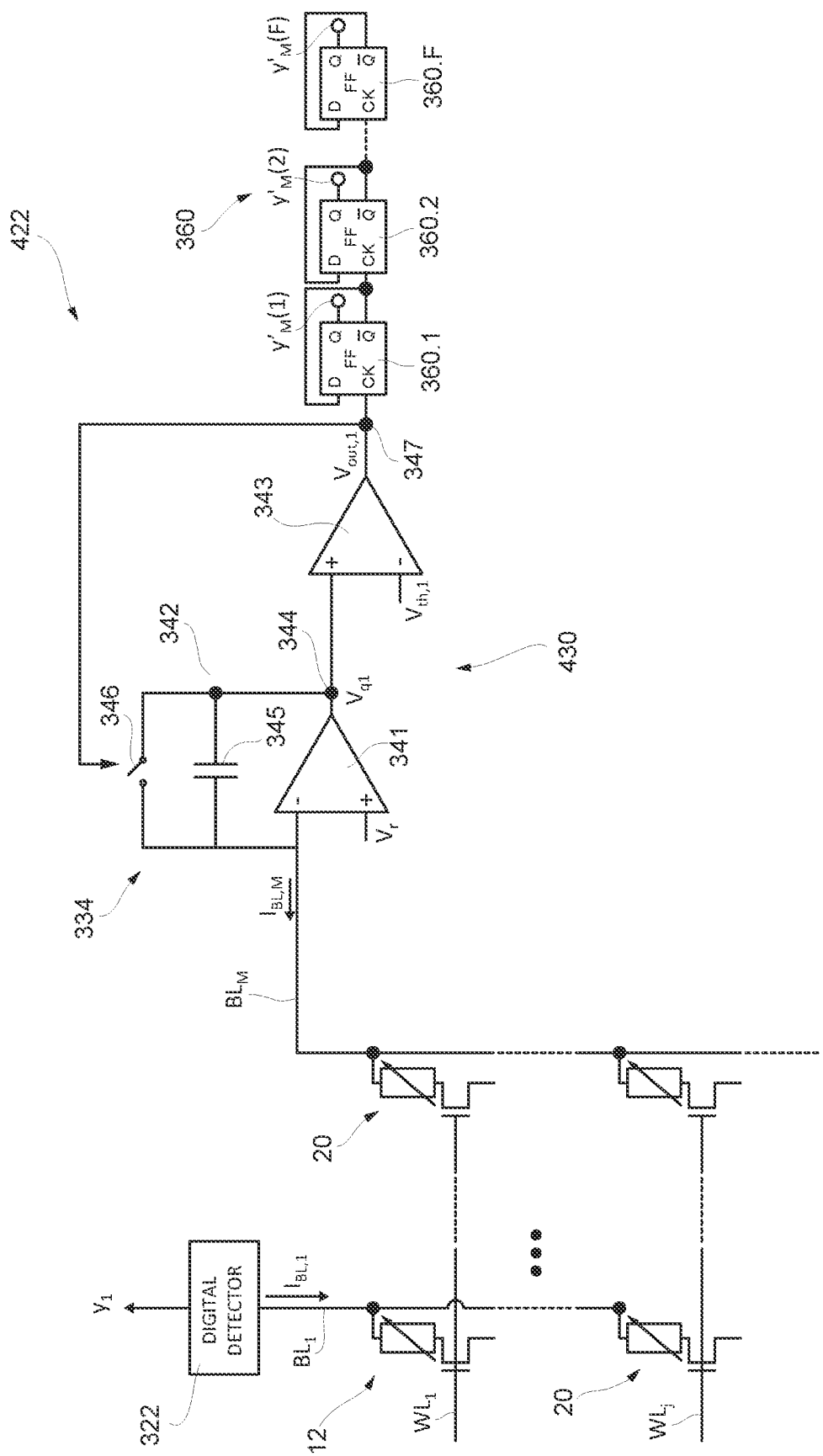
FIG. 12 shows a circuit diagram of a digital detector of the present in-memory computation device.

For example, the integration stage 110, 330 of the digital detectors 16, 322 may comprise only one integration circuit, thereby without even comprising the respective switching circuit. For example, FIG. 12 shows a different embodiment of the digital detectors, here indicated by 422, comprising each only the first integration circuit 334 and the first counter circuit 360. In practice, the digital detectors 422 of FIG. 12 do not comprise the switching circuit 336, the second integration circuit 335 and the second counter circuit 361 discussed with reference of FIG. 10.

The integration stage of each digital detector may be coupled to the respective bit line $BL_i$ differently from what shown and described; for example, the integration stage 110 of FIG. 5 may be coupled to the bit line $BL_i$ without the current mirror 115, so that the integration stage 110 receives at the input node 116 directly the bit line current $I_{BL,i}$.

The integration stage 190 of the timer 45 may have the same circuit diagram as the integration stage 110, 330, 430 of any of the digital detectors 16, 322, 422, i.e. they may have equal circuit elements providing the integration signal and equal circuit elements providing the control signal from the integration signal.

In other words, for example as discussed above with reference to FIGS. 5 and 8, the integration stage of the timer and the integration stage of the digital detector may each have a first inverter and a capacitor providing the integration signal and a second inverter providing the control signal that is used by the respective counter stage.

In this case, the capacitors of the integration stage of the digital detector and the capacitor of the integration stage of the timer may have the same capacitance value; and/or the first inverter of the integration stage of the digital detector may be equal to the first inverter of the integration stage of the timer; and/or the second inverter of the integration stage of the digital detector may be equal to the second inverter of the integration stage of the timer, e.g. having the same switching threshold.

The integration stage of the timer and the digital detector may each have only one integration circuit (for example similarly to what is discussed with reference to FIG. 12) or a first and a second integration circuit mutually coupled by a switching circuit.

Finally, the illustrated embodiments may be combined to provide further solutions.

For example, the charge counter stage 110 of the digital detectors 16 (FIG. 5) may comprise a second set of flip-flops, instead of the inverter 144, coupled to the second node 141 of the switching circuit 123, and a combination circuit, similarly to what is described with reference to FIG. 10.

In addition or as an alternative, the charge counter stage 195 of the timer 45 (FIG. 8) may comprise a second set of flip-flops, instead of the inverter 216, coupled to the second node 214 of the switching circuit 193, and a combination circuit, similarly to what is described with reference to FIG. 10.

For example, with reference to FIG. 10, the operational amplifiers 343 or 352 may be replaced by an inverter, as in the digital detectors 16 of FIG. 5. In practice, the integration stage and the counter stage of the digital detectors may each be formed by a combination of the elements forming the digital detectors 16, 322 of FIGS. 5 and 10, respectively. Similar considerations apply, mutatis mutandis, to the integration stage and the counter stage of the timer, which, according to an embodiment, may have the same circuit diagram as the integration stage and counter stage of the digital detectors.

The invention claimed is:

1. An in-memory computation device, comprising:
a word line activation circuit configured to receive an input signal indicative of a plurality of input values and to provide a plurality of activation signals, wherein each activation signal is a function of a respective input value;
a biasing circuit configured to provide a bias voltage in response to a reference current;
a memory array comprising a plurality of memory cells coupled to a bit line and coupled each to a respective word line, wherein the bit line is configured to receive the bias voltage, wherein the memory cells are configured to each store a respective computational weight and to each receive a respective activation signal from the respective word line, wherein a respective cell current flows through each memory cell as a function of the bias voltage, the respective activation signal and the respective computational weight, and wherein a bit line current flows through the bit line as a function of a summation of the cell currents; and a digital detector coupled to the bit line and configured to sample the bit line current and, in response, provide at least one output signal.

2. The in-memory computation device according to claim 1, wherein the biasing circuit comprises a reference network having a variable reference impedance through which the reference current flows, wherein the bias voltage is a function of the reference current and the variable reference impedance.

3. The in-memory computation device according to claim 2, wherein the reference network comprises a reference memory array configured to have a reference transconductance value, wherein the variable reference impedance is a function of the reference transconductance value, the reference memory array representing a statistically significant sample of the memory array.

4. The in-memory computation device according to claim 1, wherein the activation signals are each a pulse signal having a duration that is a proportional function of the respective input value.

5. The in-memory computation device according to claim 1, wherein the word line activation circuit comprises a timer configured to provide a timer signal, and a plurality of input-time converters configured to compare the timer signal with a respective input value and, in response, to provide the respective activation signal.

6. The in-memory computation device according to claim 5, wherein the timer is configured to provide the timer signal in response to an oscillator current, wherein the timer is configured to update the timer signal at an update frequency that is a function of the oscillator current.

7. The in-memory computation device according to claim 6, wherein the timer is configured to generate the oscillator current from the reference current.

8. The in-memory computation device according to claim 7, further configured to receive an external signal from a user, wherein the oscillator current is a function of the external signal.

9. The in-memory computation device according to claim 8, wherein the timer comprises an integration stage and a counter stage and is configured to perform a number of successive timing iterations, wherein, in each timing iteration:

the integration stage is configured to generate a respective integration signal indicative of a time integral of the oscillator current, compare the integration signal with an oscillator threshold, and reset the integration signal in response to the integration signal reaching the oscillator threshold; and the counter stage is configured to update the timer signal in response to the integration signal reaching the oscillator threshold.

10. The in-memory computation device according to claim 5, wherein the word line activation circuit is configured to compare the timer signal with a maximum count signal and, in response, to provide an end-computation signal, wherein the digital detector is configured to receive the end-computation signal and stop sampling the bit line current in response to receiving the end-computation signal.

11. The in-memory computation device according to claim 1, wherein the digital detector comprises an integration stage and a counter stage, and is configured to perform a number of successive sampling iterations, wherein, in each sampling iteration:

the integration stage is configured to generate an integration signal indicative of a time integral of the bit line current, compare the integration signal with a sampling threshold, and reset the integration signal in response to the integration signal reaching the sampling threshold; and the counter stage is configured to update the output signal in response to the integration signal reaching the sampling threshold.

12. The in-memory computation device according to claim 11, wherein the integration stage of the digital detector has a same circuit diagram as the integration stage of the timer.

13. The in-memory computation device according to claim 11, wherein the integration stage comprises a first inverter having an output providing the integration signal, and an integration capacitive element coupled at the output of the first inverter, wherein the first inverter is configured to receive a biasing current indicative of the bit line current.

14. The in-memory computation device according to claim 13, wherein the first inverter has an input configured to receive a control signal indicative of the integration signal reaching the sampling threshold, and wherein the first inverter is configured, as a function of the control signal, to charge the integration capacitive element with the biasing current or to discharge the integration capacitive element.

15. The in-memory computation device according to claim 11, wherein the integration stage comprises a first operational amplifier having a first input and an output, and an integration capacitive element coupled between the first input of the first operational amplifier and the output of the first operational amplifier, and wherein the first operational amplifier is configured to receive, at the first input, a current indicative of the bit line current.

16. The in-memory computation device according to claim 11, wherein the integration stage comprises a second inverter having a switching threshold and receiving the integration signal, wherein the sampling threshold is the switching threshold of the second inverter.

17. The in-memory computation device according to claim 11, wherein the integration stage comprises a second operational amplifier having a first input and a second input, and wherein the second operational amplifier is configured to receive the integration signal at the first input and the sampling threshold at the second input.

18. The in-memory computation device according to claim 11, wherein the integration signal is a first integration signal and the sampling threshold is a first sampling threshold, the integration stage comprising a first integration circuit configured to generate the first integration signal, compare the first integration signal with the first sampling threshold and reset the first integration signal, the integration stage further comprising a second integration circuit and a switching circuit coupled between the first and the second integration circuits;

wherein the second integration circuit is configured to generate a second integration signal indicative of a time integral of the bit line current, compare the second integration signal with a second sampling threshold and reset the second integration signal in response to the second integration signal reaching the second sampling threshold;

wherein the counter stage is configured to update the output signal also in response to the second integration signal reaching the second threshold;

wherein the switching circuit is configured to disable the first integration circuit and enable the second integration circuit, in response to the first integration signal reaching the first threshold, and to enable the first integration circuit and disable the second integration circuit, in response to the second integration signal reaching the second threshold.

19. The in-memory computation device according to claim 1, wherein the memory cells each have a current path comprising a storing element and a selection element and extending between a common node and a reference potential node, wherein the selection element is configured to selectively close the respective current path as function of the respective activation signal.

20. The in-memory computation device according to claim 1, wherein the memory cells are non-volatile memory cells.

21. A method for controlling an in-memory computation device configured to receive an input signal indicative of a plurality of input values and to provide at least one output signal, the in-memory computation device comprising a word line activation circuit, a biasing circuit, a memory array and a digital detector, the memory array comprising a plurality of memory cells coupled to a bit line and coupled each to a respective word line, wherein the memory cells are configured to each store a respective computational weight and to each receive a respective activation signal from the respective word line, wherein a respective cell current flows through the memory cells as a function of a bias voltage, the respective activation signal and the respective computational weight, and wherein a bit line current flows through the bit line as a function of a summation of the cell currents;

the method comprising:
- providing, by the word line activation circuit, a plurality of activation signals to the memory cells, wherein each activation signal is a function of a respective input value;
- generating the bias voltage from a reference current and applying the bias voltage to the bit line; and
- sampling, by the digital detector, the bit line current, and, in response, providing the at least one output signal.

\* \* \* \* \*